United States Patent
Samosir et al.

(10) Patent No.: US 12,361,644 B1
(45) Date of Patent: Jul. 15, 2025

(54) METHODS FOR UPDATING KNITTING INSTRUCTIONS BASED ON PHYSICAL MEASUREMENT OF KNITTED ARTICLE

(71) Applicant: Global Apparel Partners Inc., Malibu, CA (US)

(72) Inventors: William Samosir, Brooklyn, NY (US); Lawrence Panozzo, San Antonio, TX (US); Garrett Li Gerson, Malibu, CA (US)

(73) Assignee: Global Apparel Partners Inc., Malibu, CA (US)

( * ) Notice: Subject to any disclaimer, the term of this patent is extended or adjusted under 35 U.S.C. 154(b) by 0 days.

(21) Appl. No.: 18/930,904

(22) Filed: Oct. 29, 2024

(51) Int. Cl.
*G06T 17/20* (2006.01)

(52) U.S. Cl.
CPC .... *G06T 17/20* (2013.01); *G05B 2219/45194* (2013.01); *G06T 2200/24* (2013.01)

(58) Field of Classification Search
CPC .......... G05B 2219/45194; D04B 37/00; D04B 37/02
USPC ......................................... 700/141
See application file for complete search history.

(56) References Cited

U.S. PATENT DOCUMENTS

| | | | | |
|---|---|---|---|---|
| 5,836,177 | A * | 11/1998 | Okuno | D04B 37/02 66/64 |
| 6,611,730 | B1 * | 8/2003 | Stoll | D04B 7/26 700/131 |
| 7,437,774 | B2 * | 10/2008 | Baron | D03D 15/50 2/DIG. 2 |
| 11,913,149 | B2 * | 2/2024 | Karmon | D04B 37/00 |
| 2007/0250203 | A1 * | 10/2007 | Yamamoto | G06T 19/00 700/98 |
| 2014/0319734 | A1 * | 10/2014 | Voit | H04R 25/652 264/129 |
| 2019/0368085 | A1 * | 12/2019 | Morgan | D04B 37/02 |
| 2021/0357555 | A1 * | 11/2021 | Liu | G06F 30/27 |
| 2023/0250567 | A1 * | 8/2023 | Harwood | D04B 1/265 66/232 |

(Continued)

OTHER PUBLICATIONS

Liu et al., "Knitting 4D Garments with Elasticity Controlled for Body Motion," ACM Transactions on Graphics, vol. 40, No. 4 (Aug. 2021) (Year: 2021).*

(Continued)

*Primary Examiner* — Grace Huang
(74) *Attorney, Agent, or Firm* — Ascenda Law Group, PC

(57) ABSTRACT

A method for updating knitting instructions begins by defining virtual reference indicators on a surface of a three-dimensional (3D) model of an article to be knitted by a knitting machine, the virtual reference indicators partitioning the surface of the 3D model into one or more regions. Then, knitting instructions that specify the virtual reference indicators defined on the surface of the 3D model are to be knitted as physical reference indicators that form part of the knitted article are generated. These knitting instructions are subsequently updated by adjusting a number of courses and/or wales within the one or more regions of the 3D model based on a compensation factor that accounts for differences between a physical measurement that specifies a distance along a path defined by one or more of the physical reference indicators that form part of the knitted article, and an intended dimension of the distance.

20 Claims, 24 Drawing Sheets

(56) References Cited

U.S. PATENT DOCUMENTS

2023/0357969 A1* 11/2023 Samosir .................. G06F 30/10
2024/0044057 A1* 2/2024 Conti ..................... D04B 21/08
2025/0005212 A1* 1/2025 Yan ........................ G06F 30/12

OTHER PUBLICATIONS

CAD Intentions. "AutoCAD How to Add Dimensions The Easy Way!: Quick Dimension 1:41" Youtube. Oct. 25, 2024. https://www.youtube.com/watch?v=filx2IRh190 (enlarged) (Year: 2024).*
CAD Intentions. "AutoCAD How to Add Dimensions The Easy Way!: Quick Dimension 1:41" Youtube. Oct. 25, 2024. https://www.youtube.com/watch?v=filx2IRh190 (Year: 2024).*
CAD Intentions. "AutoCAD How to Add Dimensions The Easy Way!: Quick Dimension 1:24" Youtube. Oct. 25, 2024. https://www.youtube.com/watch?v=filx2IRh190 (enlarged) (Year: 2024).*
CAD Intentions. "AutoCAD How to Add Dimensions the Easy Way!: Quick Dimension 1:24" Youtube. Oct. 25, 2024. https://www.youtube.com/watch?v=filx2IRh190 (Year: 2024).*

* cited by examiner

Knitting Sections

Sections

▼ change all

| Section | H mult | Gore Type |
|---|---|---|
| ▪ | 1.00 X | exponential ▼ |
| ▪ | 1.00 X | exponential ▼ |
| ▪ | 1.00 X | exponential ▼ |
| ▪ | 1.00 X | exponential ▼ |
| ▪ | 1.00 X | exponential ▼ |
| ▪ | 1.00 X | exponential ▼ |
| ▪ | 1.00 X | exponential ▼ |
| ▪ | 1.00 X | exponential ▼ |
| ▪ | 1.00 X | exponential ▼ |
| ▪ | 1.00 X | exponential ▼ |
| ▪ | 1.00 X | exponential ▼ |
| ▪ (54a) | 1.30 X (56) | exponential ▼ |

0 (59)

D2D0AAFF
R:210, G:208, B:170, A:255
(0.824, 0.816, 0.667, 1.000)

METHODS FOR UPDATING KNITTING INSTRUCTIONS BASED ON PHYSICAL MEASUREMENT OF KNITTED ARTICLE

FIELD OF THE INVENTION

The present invention relates to methods for updating knitting instructions based on a physical measurement of a knitted article, and more particularly relates to knitting the knitted article with physical reference indicators which correspond to virtual reference indicators of a three-dimensional (3D) model of the knitted article.

BACKGROUND

In a general process for knitting a knitted article, a three-dimensional (3D) model is created of the knitted article, knitting instructions are generated based on the 3D model, and the knitted article is knitted in accordance with the knitting instructions. However, due to various factors, the dimensions of the knitted article may not match the desired (or designed) dimensions specified in the 3D model. The techniques described hereinbelow provide solutions to address such challenge.

SUMMARY OF THE INVENTION

In accordance with one embodiment of the invention, a method for updating knitting instructions may include defining one or more virtual reference indicators on a surface of a three-dimensional (3D) model of an article to be knitted by a knitting machine. The 3D model may be defined in a 3D space represented in an application running on a computer system and may be displayed on a display of the computer system within a user interface of the application. The one or more virtual reference indicators may partition the surface of the 3D model into one or more regions. In one embodiment, the one or more virtual reference indicators may include section lines which partition the surface of the 3D model into sections. In one embodiment, the one or more virtual reference indicators may include virtual reference lines or virtual reference points.

The method may include generating knitting instructions for the knitting machine, the knitting instructions specifying that the virtual reference indicators defined on the surface of the 3D model are to be knitted as physical reference indicators that are visible on a surface of the knitted article. The generating of the knitting instructions may include generating a 3D knit mesh from the 3D model, the 3D knit mesh including polygons which represent one or more stitches of the knitted article. In one embodiment, a subset of the polygons may be selected to represent the one or more virtual reference indicators on the 3D knit mesh. The generating of the knitting instructions may further include generating a two-dimensional (2D) knitting map from the 3D knit mesh, the 2D knitting map including a subset of pixels which represent the one or more virtual reference indicators on the 3D knit mesh and/or the selected subset of the polygons of the 3D knit mesh. The generating of the knitting instructions may further include generating knitting instructions from the 2D knitting map.

The method may include updating the knitting instructions by adjusting at least one of a number of courses or a number of wales within the one or more regions of the 3D model based on a physical measurement that specifies a first distance along a first path defined by one or more of the physical reference indicators. More specifically, a compensation factor may be formed as a ratio between the physical measurement and a length along a virtual reference line which corresponds to the physical measurement. The number of courses or a number of wales within the one or more regions of the 3D model may be adjusted based on the compensation factor (which may be provided by the user as an input to the application running on the computer system, e.g., via a user interface thereof that is displayed to the user via the display). If additional evaluation of the shape of the knitted article is desired, the updated knitting instructions may maintain instructions specifying that the knitted article should be knitted with the physical reference indicators. If additional evaluation of the shape of the knitted article is not desired, the updated knitting instructions may include instructions specifying that the knitted article should be knitted without the physical reference indicators.

These and other embodiments of the invention are described in more detail in the description below.

BRIEF DESCRIPTION OF THE DRAWINGS

The present invention is illustrated by way of example, and not limitation, in the figures of the accompanying drawings, in which:

FIG. 6 depicts a user interface with a table configured to receive a compensation factor for one or more sections of the 3D model, in accordance with one embodiment of the invention.

DETAILED DESCRIPTION

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention. Descriptions associated with any one of the figures may be applied to different figures containing like or similar components/steps. While the sequence diagrams each present a series of steps in a certain order, the order of some of the steps may be changed without departing from the scope of the present invention.

The application generally addresses the challenge that the designed shape of a knitted article may not fully match the real-life (physical) shape of the knitted article produced by a knitting machine (e.g., a flatbed knitting machine). For example, the designer may specify that the length of a sleeve measures 31 inches, but when the knitted article is produced, the sleeve only measures 30 inches. Rather than to focus on the various factors that may lead to the deviation of the modeled dimension(s) from the actual dimension(s) (e.g., variability in the yarn tension of the knitting machines, humidity of the environment in which the knitting machine is disposed, etc.), the application proposes a systematic way to quantify the deviation and compensate for the deviation.

Figure 1A:
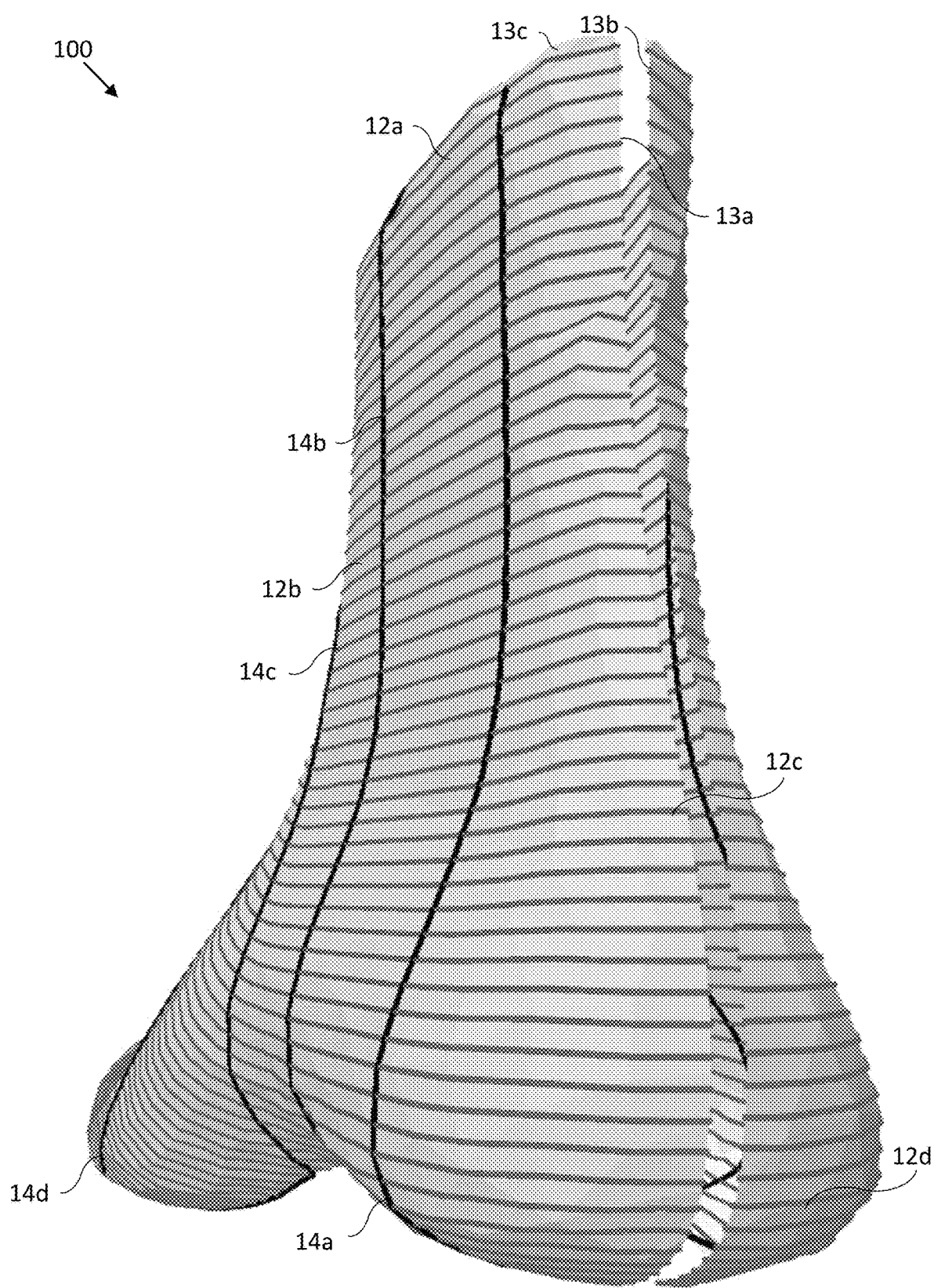
FIG. 1A depicts a three-dimensional (3D) model of a knitted article, in which isolines and a first set of virtual reference lines are depicted on a surface of the 3D model, in accordance with one embodiment of the invention.
Figure 16:
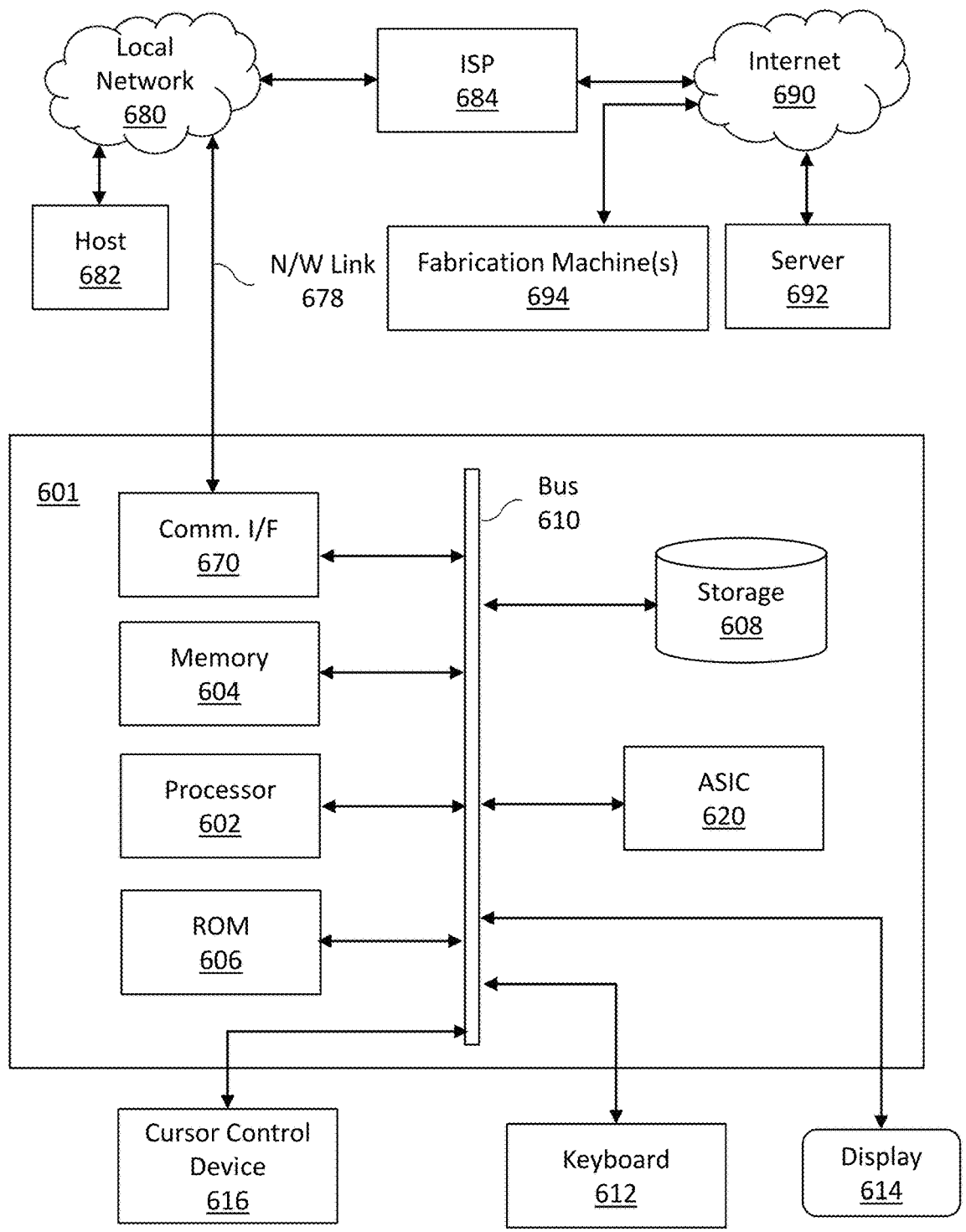
FIG. 16 illustrates an example of a networked computer system for executing computer-executable instructions for generating knitting instructions and updated knitting instructions for controlling computer-controlled machines, including flatbed knitting machines, in accordance with one embodiment of the invention.

FIG. 1A depicts a three-dimensional (3D) model 100 of a knitted article. The 3D model may be defined in a 3D space represented in an application running on a computer system. Accordingly, although not depicted in detail, it should be appreciated that the illustrations of the 3D model in FIGS. 1A-1D, 2, 5 and 9A-9B, as well as the 2D representations of that 3D model shown in FIGS. 3A-3B, show the model as it may appear presented on a display of the computer system on which said application is running, e.g., as part of a user interface thereof. An example of such a computer system is shown in FIG. 16 and discussed further below. In the example of FIGS. 1A-1D, 2, 3A-3B, 5 and 9A-9B, the knitted article to be created may form the top (that is, the upper) of a shoe (i.e., a shoe excluding the sole of the shoe). It should be understood that the manifestation of the knitted article in the form of a shoe upper is an example only, and the knitted article could more generally be embodied as any knitted article (e.g., sweater, beanie, stuffed animal, topper of a sofa, etc.).

Isolines 12a, 12b, 12c, 12d and a first set of virtual reference lines 14a, 14b, 14c are depicted on a surface of the 3D model 100. It should be understood that only a subset of the isolines and only a subset of the virtual reference lines are annotated in FIG. 1A. Methods for creating isolines on 3D models of the kind described herein are known in the art, so for the sake of brevity, a detailed discussion of same will not be provided. Further discussion of isolines may be found in the literature, for example in US 2023/0357969 to Samosir et al., incorporated herein by reference, and Liu et al., "Knitting 4D Garments with Elasticity Controlled for Body Motion," *ACM Transactions on Graphics*, Vol. 40, No. 4 (August 2021), in which isoline are referred to as "isocurves."

In the examples that follow, the knitted article is knitted by a knitting machine such that the wales run along the isolines (i.e., coincide with the isolines), and the courses run (locally) perpendicular to each of the isolines. In an alternative embodiment (not depicted), it is possible for the wales to run between two adjacent isolines (instead of coinciding with the isolines), and hence each of the isolines could be interpreted as a dividing line between adjacent wales. The precise formulation of a wale (whether the former or later) is not critical to the invention, and these formulations are merely presented for the sake of clarity. In yet another embodiment (not depicted), the courses could run along the isolines (or between two adjacent isolines), and the wales could run (locally) perpendicular to each of the isolines.

The 3D model may include edges 13a, 13b and 13c. Certain edges, such as edges 13a and 13b may be affixed together (e.g., by sewing, buttons, hook and loop fasteners such as VELCRO™ fasteners, etc.), while other edges, such as edge 13c, may remain as edges in the final knitted article. It should be understood that other edges may exist in the 3D model that are not visible in FIG. 1A, such as an edge that runs on the "bottom" of the shoe upper. Such an edge can be more clearly understood in the context of the knitted article depicted in FIGS. 8A-8C.

While the description will generally refer to virtual reference lines, it should be understood that virtual references lines are merely one example of a broader class of virtual reference indicators, which may include virtual reference lines, virtual reference points, virtual reference shapes (e.g., circles, triangles, squares, rectangles, and so on), etc.

Figure 1B:
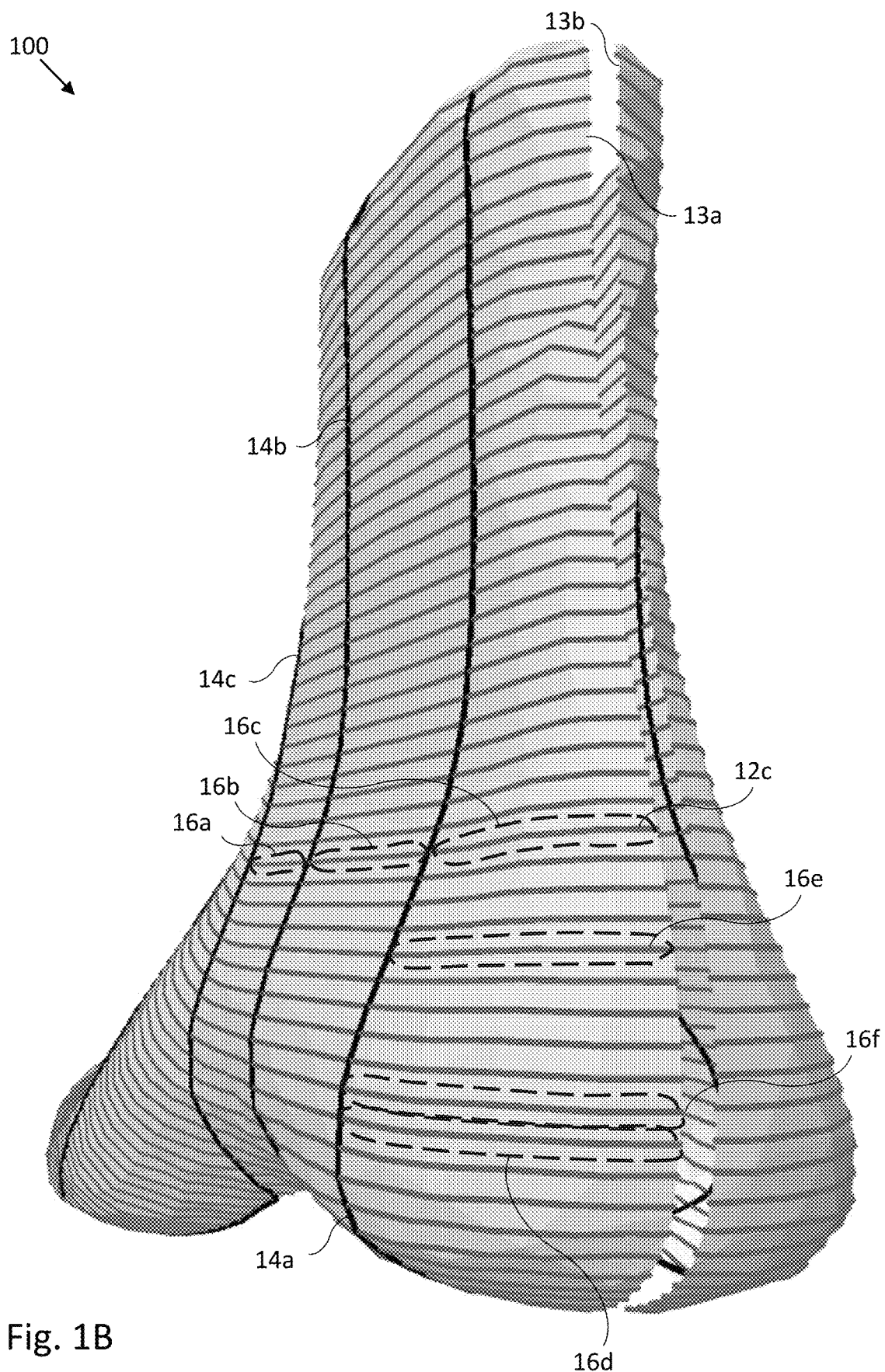
FIG. 1B indicates example isoline segments on the 3D model of FIG. 1A, in accordance with one embodiment of the invention.

FIG. 1B illustrates isoline 12c being segmented into isoline segments 16a, 16b and 16c by virtual reference lines 14a, 14b, 14c. It should be understood that isoline 12c runs from edge 13a to edge 13b, so there are additional isolines segments that exist but are not visible in the current view. It should further be understood that the other isolines are similarly segmented into isoline segments by the virtual reference lines. These other isolines segments have not been annotated for the sake of conciseness.

Figure 1C:
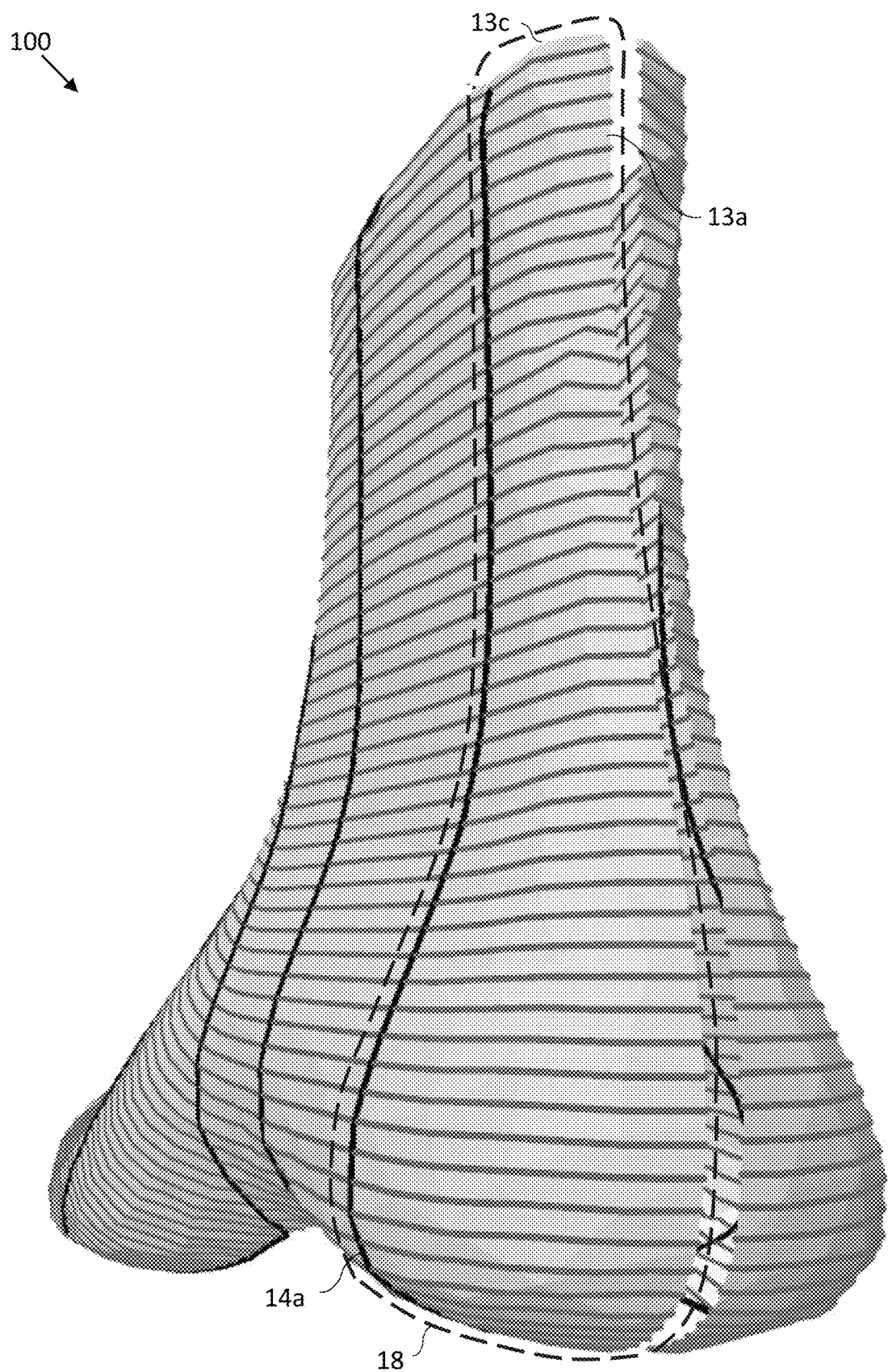
FIG. 1C indicates an example section of the surface of the 3D model of FIG. 1A, in accordance with one embodiment of the invention.

In FIG. 1C, section 18 is annotated on the surface of the 3D model, and is formed by virtual reference line 14a, edge 13a, edge 13c and a bottom edge (not visible in the current view). Other sections are present in FIG. 1C, but have not been annotated for the sake of conciseness. For completeness, it is noted that section 18 includes virtual reference line 14a, the section next to section 18 (not annotated) includes virtual reference line 14b, and so on. This convention is mentioned for the sake of ease of discussion, and other conventions may be employed in practice. Generally, one may understand the virtual reference lines 14a, 14b, 14c to divide the surface of 3D model 100 into "sections."

In another embodiment (not depicted), sections may be formed by section lines, which may be a separate group of lines than virtual reference lines. The reason for this additional degree of freedom to define sections independently of the location of virtual reference lines is that the section lines may influence the placement of apexes within the knitted article, and it may be convenient to be able to independently control of the placement of apexes and the location of the virtual reference lines. Such details are not critical to the present invention, but are being mentioned for completeness.

Figure 1D:
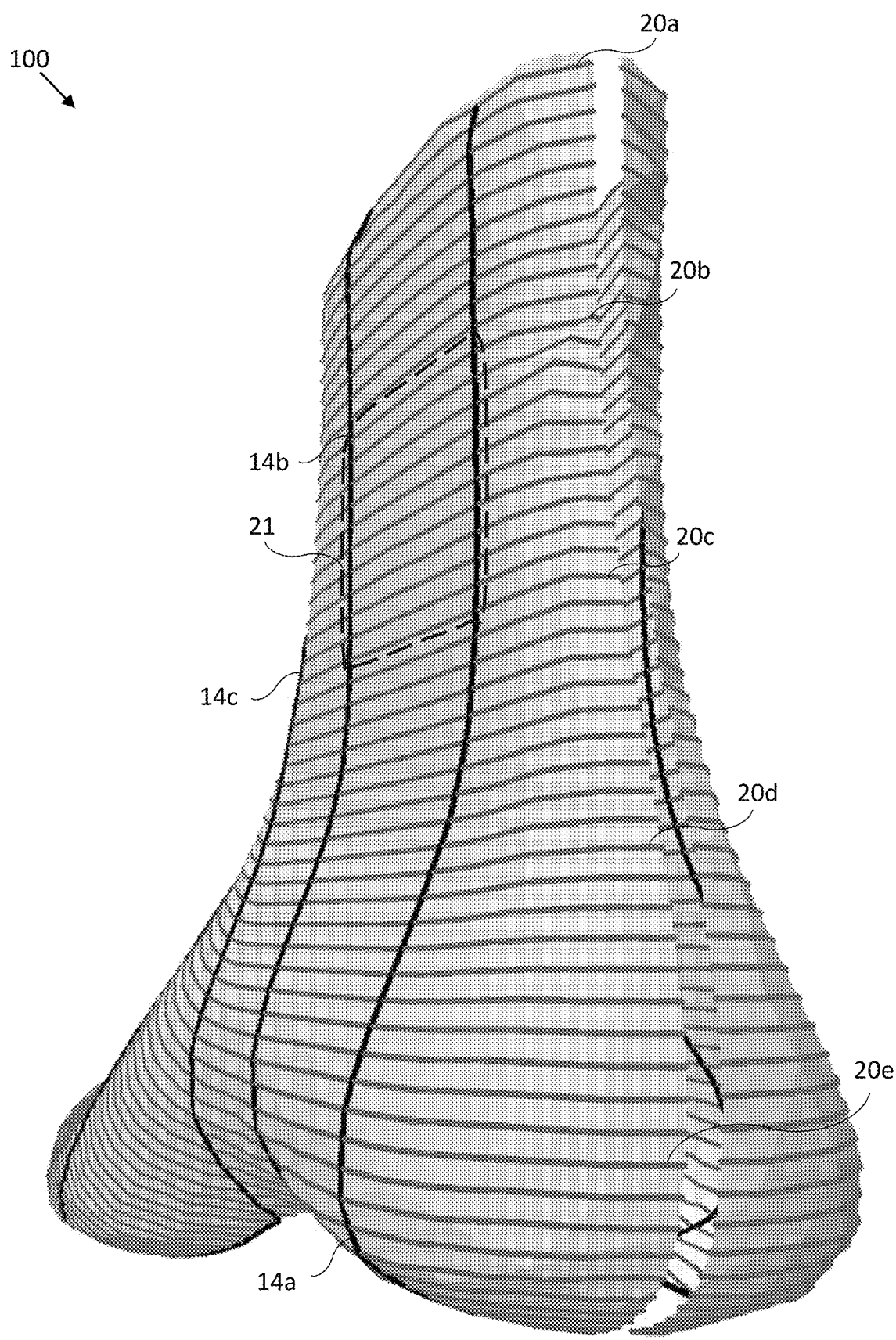
FIG. 1D indicates a selection of isolines on the 3D model of FIG. 1A which are designated as a second set of virtual reference lines and an example region formed by the first and second sets of virtual reference lines, in accordance with one embodiment of the invention.

FIG. 1D indicates a selection of isolines 20a, 20b, 20c, 20d and 20e on the 3D model 100 of FIG. 1A which are designated as a second set of virtual reference lines. Such a selection may be made by a user, for example using a selection tool available as part of the user interface of the application running on the computer system. Or, the selection may be made using appropriate menu options within such an application. In other instances, the selection may be made automatically by subroutines of the application itself. In the particular example of FIG. 1D, every tenth isoline is designated as a virtual reference line (counting from the top). However, it should be understood that such choice of spacing between virtual reference lines is only provided as an example only, and other spacings are possible (e.g., every fifth isoline, every other isoline, etc.). The first set of virtual reference lines and the second set of virtual reference lines may partition the surface of 3D model 100 into a plurality of regions, with one of the regions 21 being indicated in FIG. 1D.

The first and/or second sets of virtual reference lines may be specified automatically or manually. In an automatic specification of virtual reference lines, it may be beneficial to automatically allocate more virtual reference lines to regions of the 3D model with greater curvature, and fewer virtual reference lines to regions of the 3D model with less curvature (where greater or lesser curvature is defined relative to an average curvature within the model or with respect to a flat plane, or other reference, such as a threshold curvature). The reason is that regions with more curvature or changes in curvature have more design variables (e.g., short rows, transfers, apexes), so there is more of a likelihood for the designed dimensions to deviate from the real-life (physical) dimensions. In a manual specification of virtual reference lines, a user interface may be provided for the user to specify the location of one or more virtual reference lines over the surface of the 3D model. In one embodiment, the specification of virtual reference lines may involve a combination of manual and automatic specification. For instance, the user may specify that a certain region (e.g., sleeve, collar, etc.) of the 3D model have a certain number of virtual reference lines, and the computer system may automatically populate that region with the specified number of virtual reference lines. As another example, the user may specify a desired average spacing between adjacent virtual reference lines, and the computer system may populate the 3D model with virtual reference lines in accordance with such user specification. In yet another example, the computer system may automatically specify virtual reference lines over a surface of a 3D model, and a user interface tool (e.g., a cursor or similar tool) may be provided for the user to adjust the location of the automatically generated virtual reference lines.

Figure 2:
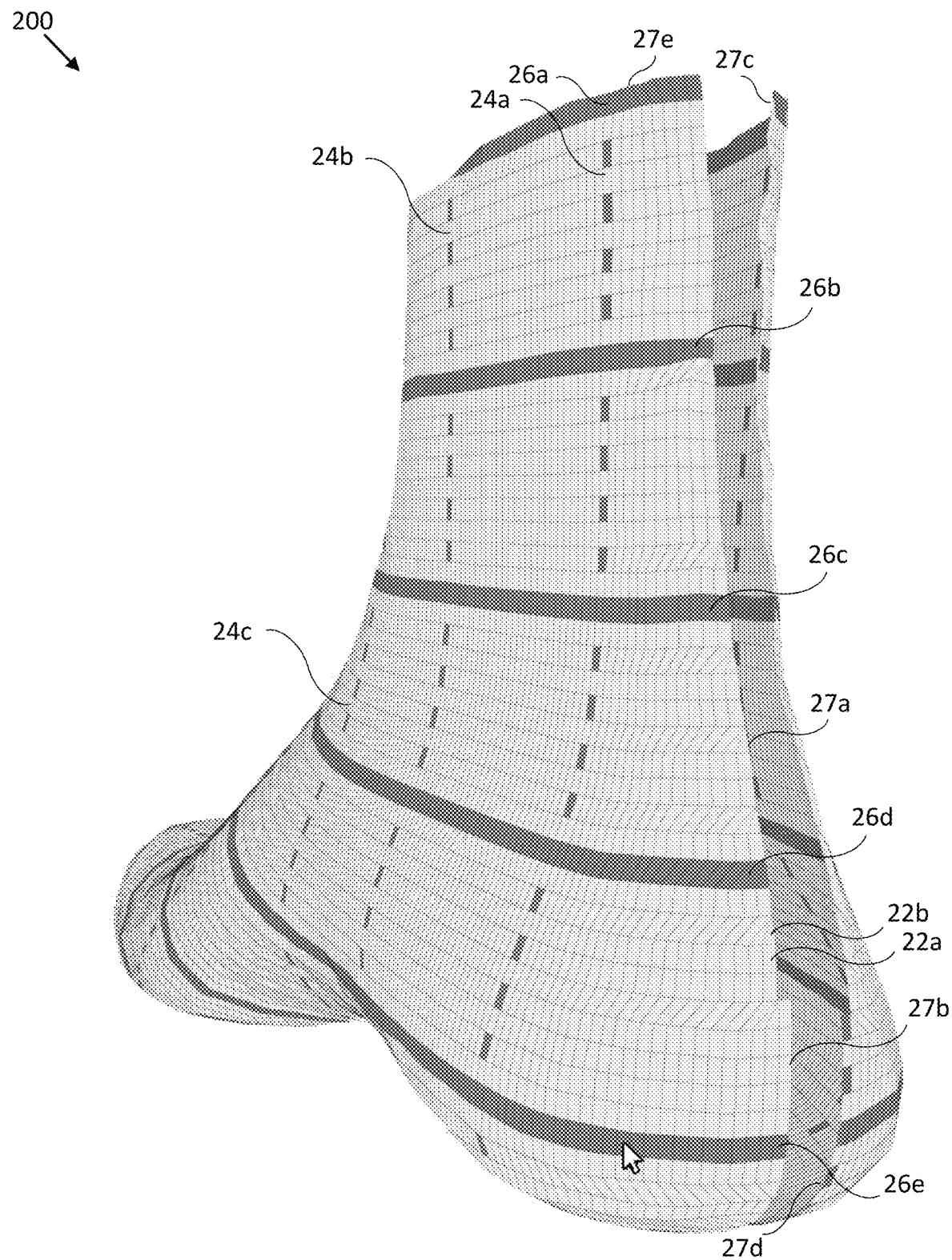
FIG. 2 depicts a 3D knit mesh of the knitted article, in which a subset of the polygons of the 3D knit mesh have been selected to indicate the first and second sets of virtual reference lines on the 3D knit mesh, in accordance with one embodiment of the invention.
Figure 3A:
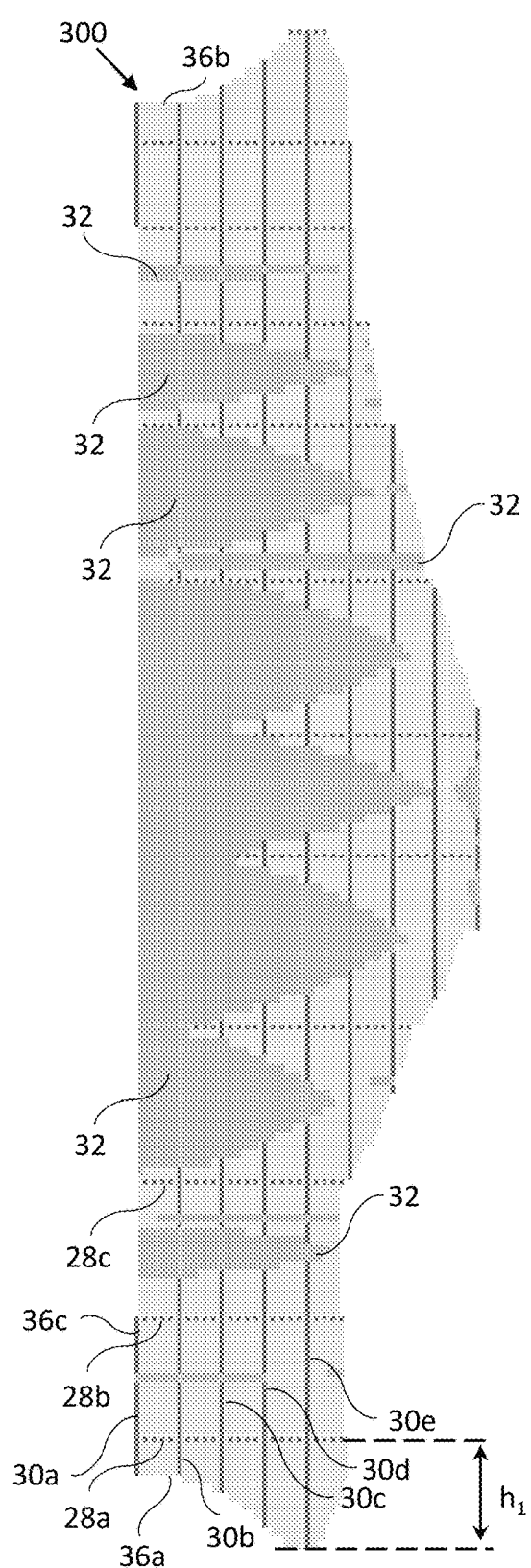
FIG. 3A depicts a two-dimensional (2D) knitting map which has been generated from the 3D knit mesh of FIG. 2 (which is identical to the 3D knit mesh of FIG. 9A), in accordance with one embodiment of the invention.
Figure 3B:
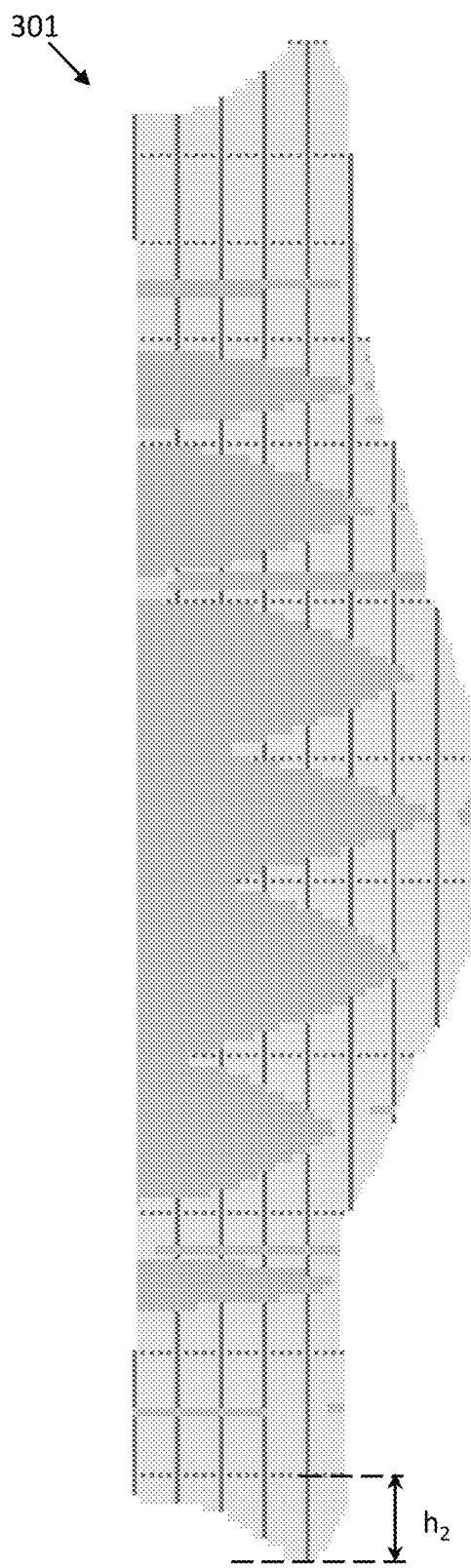
FIG. 3B depicts a 2D knitting map which has been generated from the compensated 3D knit mesh of FIG. 9B, in accordance with one embodiment of the invention.

FIG. 2 depicts 3D knit mesh 200 of the knitted article, in which a subset of the polygons of the 3D knit mesh 200 have been selected to indicate the first and second sets of virtual reference lines on the 3D knit mesh 200. Methods for constructing a 3D knit mesh from a 3D model are known in the literature and will not be discussed in detail herein for the sake of conciseness. Further discussion of a 3D knit mesh may be found in the literature, for example in US 2023/0357969 to Samosir et al., and Liu et al., "Knitting 4D Garments with Elasticity Controlled for Body Motion," *ACM Transactions on Graphics*, Vol. 40, No. 4 (August 2021), each incorporated herein by reference, in which the 3D knit mesh is referred to as a "stitch mesh." The 3D knit mesh 200 may be formed by a tessellation of polygons over the surface of the 3D model 100, in which adjacent ones of the polygons share the same side. The polygons may include quadrangles (more typically referred to a "quads"), of which one is labeled as 22a, and triangles, of which one is labeled as 22b. Other shapes may also be present. Each polygon may represent a set number of stitches in the knitted article. For example, each polygon may correspond to a single stitch of the knitted article. As another example, each polygon may correspond to n stitches of the knitted article, in which n is a natural number.

In the example of FIG. 2, edges 27a, 27b of the 3D knit mesh 200 may correspond to edge 13a of the 3D model 100; edges 27c, 27d of the 3D knit mesh 200 may correspond to edge 13b of the 3D model 100; and edge 27e of the 3D knit mesh 200 may correspond to edge 13c of the 3D model 100. Further, the first course of the knitted article may form edge 27a, and the second course of the knitted article may form edge 27b. Subsequent courses may build upon the second course, and the last course of the knitted article may form edge 27d. A triangle in the example of FIG. 2 may represent an end of a short row (or an end of a row of courses, in which it is understood that a "row" extends in the vertical direction in the example of FIG. 2). In another example, not depicted, a triangle could represent two wales that are merged into a single wale (which may be carried out as a "transfer" operation by a knitting machine).

In the example of FIG. 2, the grayscale fill within each of the polygons may indicate a color of yarn of the knitted article. For instance, the darker shade of fill may correspond to black yarn and the lighter shade of fill may correspond to white yarn. More generally, the grayscale fill within each of the polygons may correspond to a type of stitch, or any other yarn characteristic(s) that can be used to distinguish one stitch from another stitch. More than one stitch characteristic may be denoted by a particular grayscale fill.

In the example of FIG. 2, the first set of virtual reference lines may be represented on the 3D knit mesh 200 as dashed (vertical) lines which run along respective courses. For example, virtual reference lines 14a, 14b and 14c may correspond to dashed lines 24a, 24b and 24c, respectively, in which each of the dashed lines may be formed by polygons with alternating shades of fill (light-dark-light-dark). Likewise, the second set of virtual reference lines may be embodied on the 3D knit mesh 200 as solid (horizontal) lines which run along respective wales. For example, virtual reference lines 20a, 20b, 20c, 20d and 20e may correspond to solid lines 26a, 26b, 26c, 26d, 26e, respectively, in which each of the solid lines may be formed by polygons with a same shade of fill (e.g., dark-dark-dark, etc.). Section 18 (as discussed above with respect to FIG. 1C) may correspond to all polygons disposed between edges 27a, 27b and dashed line 24a, and further including the polygons which form dashed line 24a. For convenience in the example of FIG. 2, the first set of virtual reference lines ran along respective course and the second set of virtual reference lines ran along respective wales. More generally, virtual reference lines need not coincide with courses and wales of a knitted article.

Figure 9B:
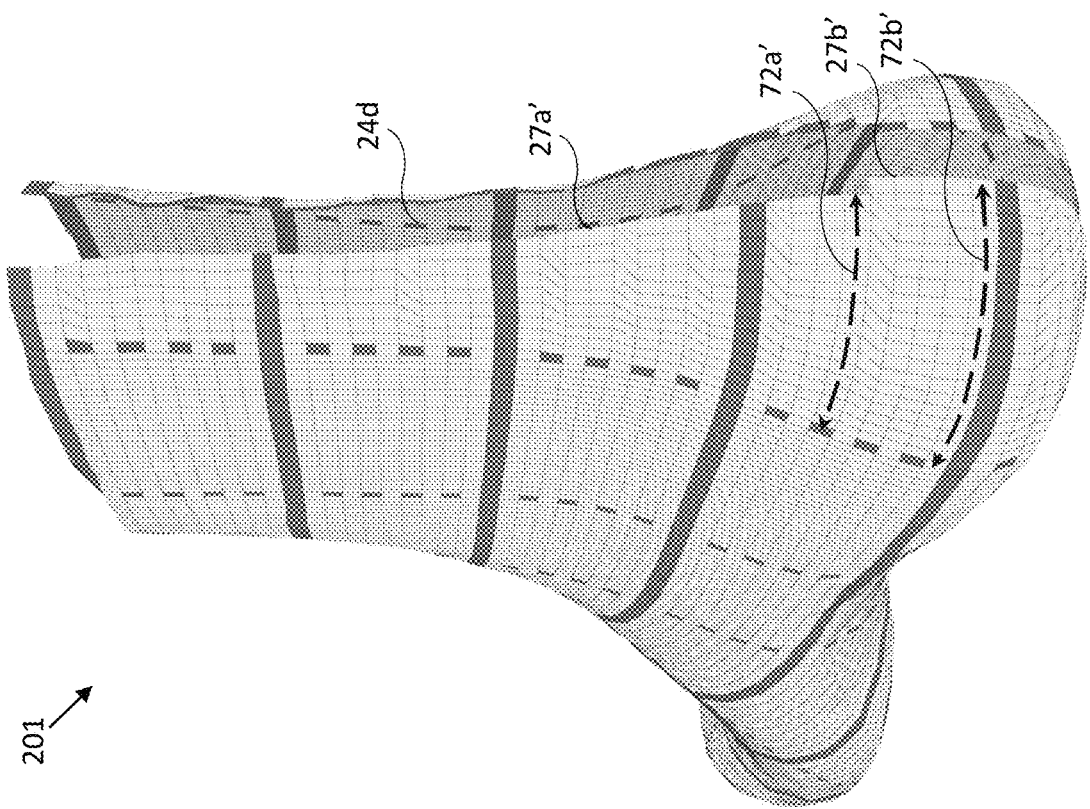
FIG. 9B depicts a 3D knit mesh (following compensation) with labels to indicate stitches that span respective isoline segments so as to facilitate the discussion of the examples of FIGS. 10A and 10B, in accordance with one embodiment of the invention.
Figure 9A:
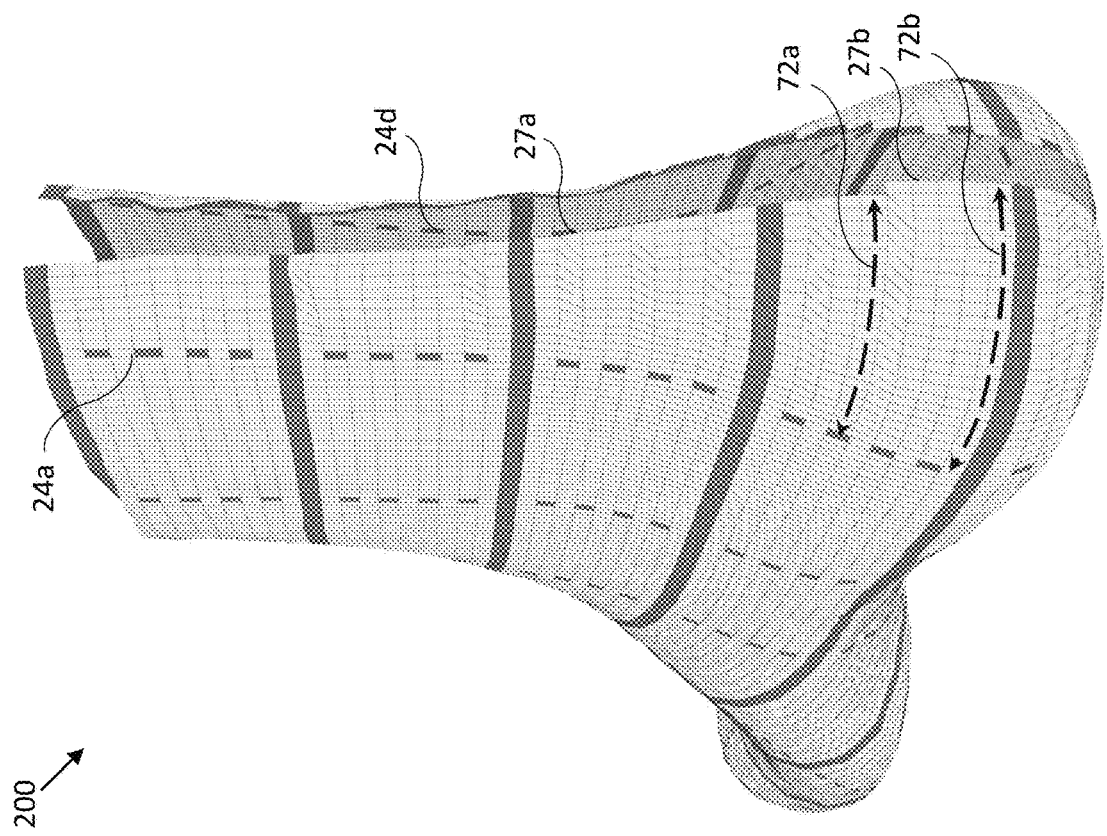
FIG. 9A depicts a 3D knit mesh (prior to compensation) with labels to indicate stitches that span respective isoline segments so as to facilitate the discussion of the examples of FIGS. 10A and 10B, in accordance with one embodiment of the invention.

FIG. 3A depicts 2D knitting map 300 which has been generated from the 3D knit mesh 200 of FIG. 2 (which is identical to the 3D knit mesh 200 of FIG. 9A). The 2D knitting map may comprise a plurality of pixels arranged within a 2D plane, each of the pixels representing one or more stitches of the knitted article. Various procedures to generate a 2D knitting map from a 3D knit mesh are known in the literature and will not be described herein for the sake of conciseness. Discussions of such procedures may be found in the literature, for example in US 2023/0357969 to Samosir et al., and Liu et al., "Knitting 4D Garments with Elasticity Controlled for Body Motion," *ACM Transactions on Graphics*, Vol. 40, No. 4 (August 2021), incorporated herein by reference, in which the 2D knitting map is referred to as a "knitting map."

In the example of FIG. 3A, edges 36a, 36b and 36c of the 2D knitting map 300 may correspond to edges 13a, 13b and 13c of the 3D model 100, respectively. Further, the first course of the knitted article may form a portion of edge 36a. Subsequent courses may build upon the first course, and the last course of the knitted article may form a portion of edge 36b. Edge 36c may be formed by one or more wales.

Similar to the 3D knit mesh, pixels represented in a certain grayscale tone may indicate a color of yarn of the knitted article. For instance, pixels depicted in a darker shade may correspond to black yarn and pixels depicted in a lighter shade may correspond to white yarn. More generally, the grayscale of each pixel may correspond to a type of stitch, or any other yarn characteristic(s) that can be used to distinguish one stitch from another stitch. More than one stitch characteristic may be denoted by a particular grayscale tone.

In the example of FIG. 3A, the first set of virtual reference lines may be represented on the 2D knitting map 300 as dashed (horizontal) lines which run along respective courses. For example, virtual reference lines 14a, 14b and 14c may correspond to dashed lines 28a, 28b and 28c, respectively, in which each of the dashed lines may be formed by pixels with alternating shades (light-dark-light-dark). Likewise, the second set of virtual reference lines may be represented on the 2D knitting map 300 as solid (vertical) lines which run along respective wales. For example, virtual reference lines 20a, 20b, 20c, 20d and 20e may correspond to solid lines 30a, 30b, 30c, 30d, 30e, respectively, in which each of the solid lines may be formed by pixels with a solid shade (e.g., dark-dark-dark, etc.). Section 18 (as discussed above with respect to FIG. 1C) may correspond to all pixels between edge 36a and dashed line 28a, and further including the pixels which form dashed line 28a.

The 2D knitting map 300 may including goring regions 32 which represent regions of the 2D knitting which are "collapsed" (when the knitted article is knitted) in the vertical dimension (i.e., "vertical" in the orientation of the 2D knitting map 300 in FIG. 3A) in order to form surfaces with curvature in the knitted article. Goring regions are known in the literature and will not be described herein in detail for the sake of conciseness. Discussion of goring regions may be found in the literature, for example in US 2023/0357969 to Samosir et al., incorporated herein by reference. In these illustrations, the grayscale color of the goring regions may appear similar to the grayscale color of the virtual reference lines in FIG. 3A, but it should be clear from context whether a pixel of the 2D knitting map corresponds to a goring region or a virtual reference line. In practice, goring regions may be indicated as completely black, completely white, or a grayscale color chosen to represent a goring region.

FIG. 3B depicts 2D knit mesh 301 following a compensation procedure. The discussion of FIG. 3B will be deferred until after the compensation procedure is described in detail. FIGS. 3A and 3B are depicted in a side-by-side manner in order to more easily allow the reader to visually compare the two 2D knit meshes.

Next, knitting instructions may be generated from the 2D knitting map, and the knitting instructions may be provided to a flatbed (or other) knitting machine, which produces a knitted article in accordance with the knitting instructions. Knitting instructions may be regarded as so-called "g-code" which, when executed by a processor of a computerized knitting machine, cause the processor to operate carriages, needles, and other components of the knitting machine to knit an article. Methods to generate knitting instructions from a 2D knitting map are known in the literature and will not be described herein for the sake of conciseness. Discussion of the generation of knitting instructions may be found in the literature, for example in US 2023/0357969 to Samosir et al., and Liu et al., "Knitting 4D Garments with Elasticity Controlled for Body Motion," *ACM Transactions on Graphics*, Vol. 40, No. 4 (August 2021), each of which is incorporated herein by reference. Importantly, in one embodiment of the invention, the knitting instructions may specify that the one or more virtual reference indicators defined on the surface of the 3D model are to be knitted as one or more physical reference indicators that are visible on a surface or otherwise as a part of the knitted article.

Figure 4:
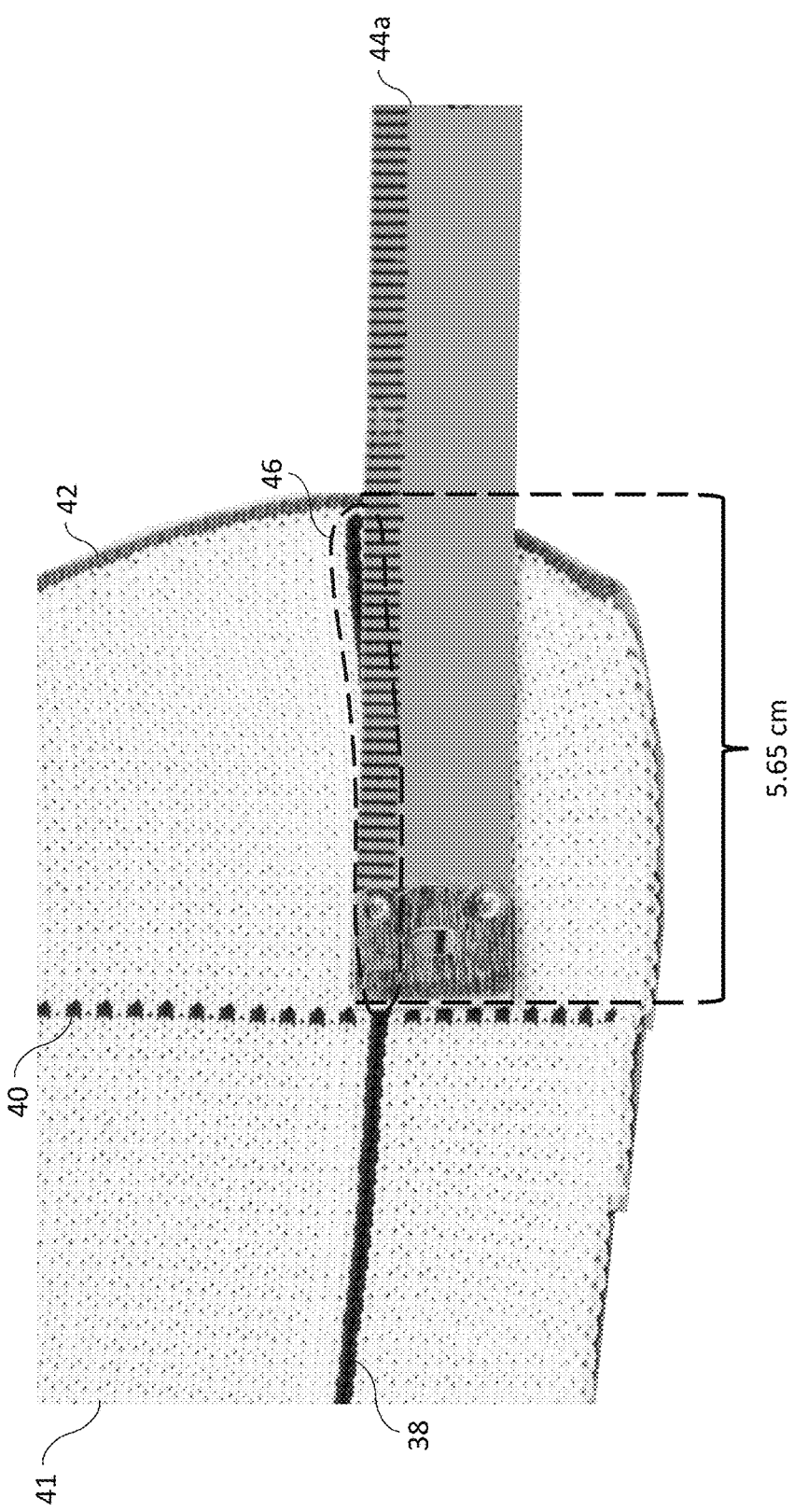
FIG. 4 depicts a portion of a knitted article that has been knitted in accordance with knitting instructions generated from the 2D knitting map depicted in FIG. 3A, in accordance with one embodiment of the invention.

FIG. 4 depicts a portion of a knitted article 41 that has been knitted in accordance with knitting instructions generated from the 2D knitting map 300 depicted in FIG. 3A. Edge 42 of the knitted article 41 may correspond to edge 13a of the 3D model 100, edge 27b of the 3D knit mesh 200 and edge 36a of the 2D knitting map 300. Physical reference (solid) line 38 of the knitted article 41 may correspond to virtual reference line 20e on the 3D model 100, solid line 26e on the 3D knit mesh 200, and solid line 30e on the 2D knitting map 300. Physical reference (dashed) line 40 of the knitted article 41 may correspond to virtual reference line 14a on the 3D model 100, dashed line 24a on the 3D knit mesh 200, and dashed line 28a on the 2D knitting map 300. In the example of FIG. 4, ruler 44a may be used to measure the length of physical reference line segment 46 (which corresponds to isoline segment 16d depicted in FIG. 1B). For purposes of this discussion, assume that the measurement reveals the length of the physical reference line segment 46 to be 5.65 cm. Such measurement provides a quantitative datapoint to assist the user to assess whether or not the dimensions of section 18 match the corresponding desired (or designed) dimensions of section 18 specified in the 3D model 100. While a single physical measurement is discussed in the example of FIG. 4, it should be understood that one or more physical measurements may be taken over various parts of the knitted article.

As should be understood, the physical reference lines may assist the user with knowing where to take the measurement(s). In the instant example, the measurement was (approximately) along physical reference line 38, and the ends of the measurement were terminated by edge 42 and physical reference line 40. For a more precise measurement, a thread could be traced along the curved isoline segment 46, the points of the thread coinciding with the edge 42 and physical reference line 40 could be marked on the thread, and the length of the thread between the two marks could be measured by ruler 44a.

Figure 5:
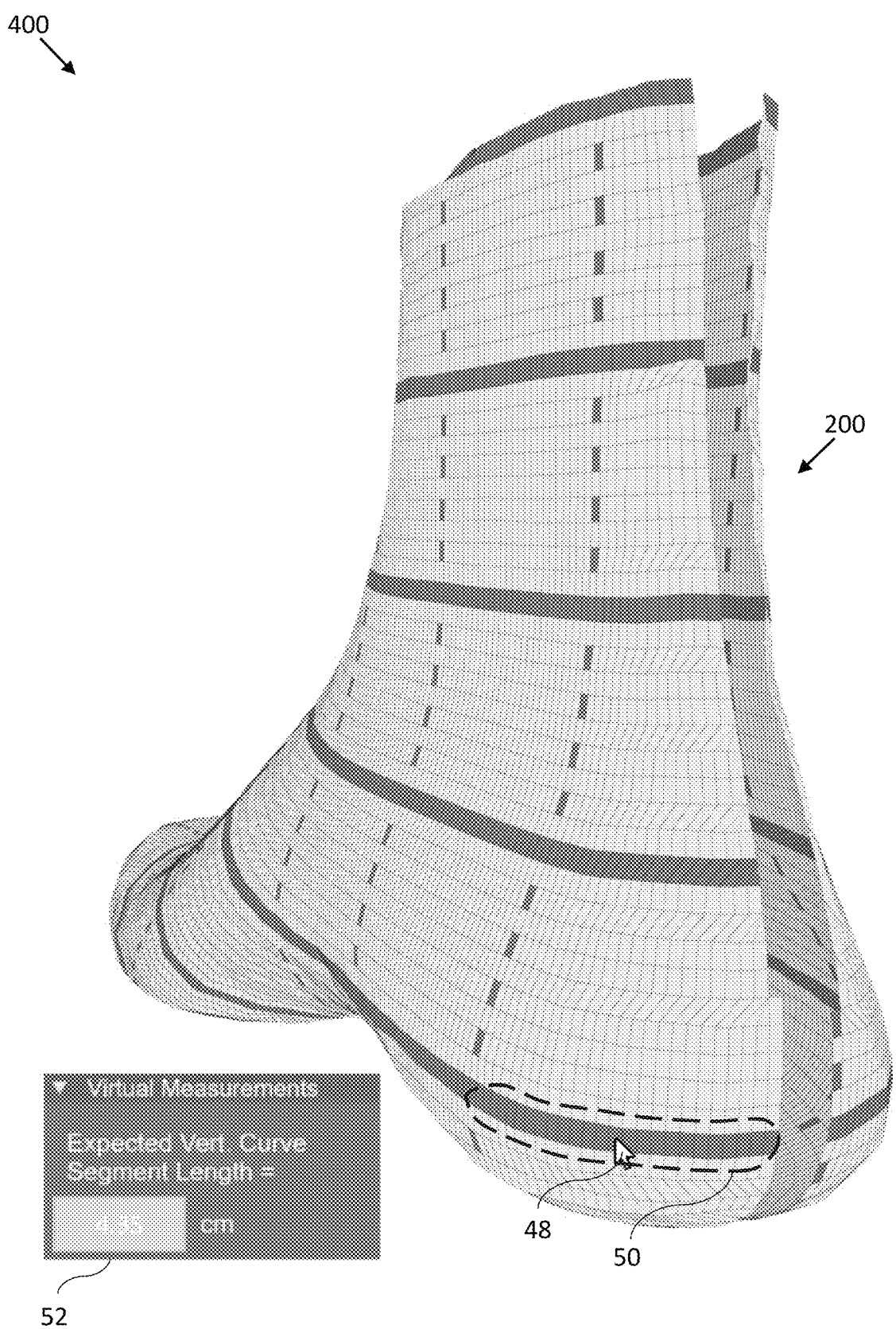
FIG. 5 depicts a user interface configured to receive a user's selection of a region of the 3D knit mesh corresponding to an isoline segment, and display the length of the corresponding isoline segment, in accordance with one embodiment of the invention.

FIG. 5 depicts a portion of a user interface 400 configured to receive a user's selection of a region of the 3D knit mesh corresponding to an isoline segment, and display the length of the corresponding isoline segment. In the example of FIG. 5, the user may use cursor 48 to select region 50 corresponding to physical reference line segment 46 (depicted in FIG. 4). More specifically, region 50 may include polygons (or stitches) of the 3D knit map 200 spanning isoline segment 16d depicted in FIG. 1B. The length of isoline segment 16d, labeled as "Expected Vert. Curve Segment Length" in portion 52 of the user interface, is indicated to be 4.35 cm. For clarity, it is noted that the selection of any polygon within region 50 may return the length of isoline segment 16e. While only one example to determine the length of an isoline segment was provided in FIG. 5, it should be understood that the length of other isoline segments could be determined in a similar fashion. Importantly, the physical measurement of 5.65 cm deviated from the designed (or desired) length of 4.35 cm (also called a "virtual measurement"). The following discussion describes a routine for adjusting the knitting instructions in order to knit a knitted article with dimensions closer to the designed (or desired) dimensions.

FIG. 6 depicts a portion of a user interface consisting of a table labeled 500 to receive a compensation factor for one or more sections (or more generally, one or more regions) of the 3D model 100. In practice, the table (or a portion thereof) may be displayed alongside or otherwise concurrently with the 3D model 100 so that as the user makes section selections in either the table or the model, the corresponding row of the table or section of the model, as appropriate, is designated on the display. In the example of FIG. 6, each row of table 500 may receive a compensation factor for a specific section of the 3D model 100. For convenience, a respective color may be associated with each section of the 3D model 100, so that the user can visually locate a row of the table 500 that corresponds to a respective section of the 3D model 100 based on a matching color indicator 54a (e.g., color box) of the row. Such color coordination is not depicted between FIG. 1C (in which all sections are depicted in the same grayscale level) and FIG. 6 (in which the color indicators are depicted in different grayscale tones), but this is so as not to unnecessarily obscure the present illustrations and the reader should appreciate that such a color-coded model may be displayed in practice. In one embodiment, the color coding may be toggled on or off at the user's direction (e.g., through a menu command or otherwise). In lieu of color coding, section numbering and overlays of such numbers as a layer of the 3D model and the table shown in FIG. 6 may be used. Or, highlighting of a section of the 3D model may be coordinated with cursor selection of a section in the table of FIG. 6 and/or vice-versa may be employed. In general, the section labeling of the table shown in FIG. 6 and the corresponding section of the 3D model may be employed so as to assist the user in entering compensation factors.

In the instant example, the physical measurement of 5.65 cm and the designed (or desired) length of 4.35 cm both correspond to section 18 (indicated in FIG. 1C), so a compensation factor may be input for section 18, which corresponds to the last row in the example. Each of the text boxes under the heading "H mult" may accept a compensation factor for each of the sections. In the instant example, the compensation factor may be computed as the measured physical distance divided by the designed (or desired) dimension, or 5.65 cm/4.35 cm, which equals 1.30. As such, 1.30 has been input into the textbox 56 of the last row. It should be understood that variants to the computation of the compensation factor are possible without deviating from the spirit of the invention, such as the compensation factor computed as the designed (or desired) dimension divided by the measured physical distance, etc. Also, in some embodiments the table 500 may be arranged to include prepopulated values for the designed (or desired) dimensions of sections and text boxes provided for the user to enter the corresponding measured physical dimensions. This relieves the user of the need to compute compensation factors and the application running on the computer system may make such computations automatically using the above ratio computation, the prepopulated value for the designed (or desired) dimension, and the entered measure physical dimension.

Returning to the illustrated example, a cursor control event (e.g., a mouse over, a mouse click, a touch pad tap) associated with a row of table 500 may cause the display of a pop-up panel 58 with additional information regarding the selected row. In the example of FIG. 6, panel 58 may include a magnified version 54b of the color indicator 54a. Panel 58 may also include a section identifier 59 (e.g., #0). While section 18 has been indicated using reference numeral 18 hereinabove, this same section is being referred to as "#0" or "section 0" in the panel 58. Lastly, panel 58 may numerically define the color depicted in color indicators 54a and 54b. In the instant example, the RBGA color specification is used (e.g., R: 210, G: 208, B: 170, A: 255), in which the value of R, G and B between 0 and 255 may indicate an intensity of red, green and blue, respectively. The value of A (or the "alpha parameter") between 0 and 255 may indicate a degree of transparency, with 0 indicating fully transparent and 255 indicating not transparent.

Figure 7:
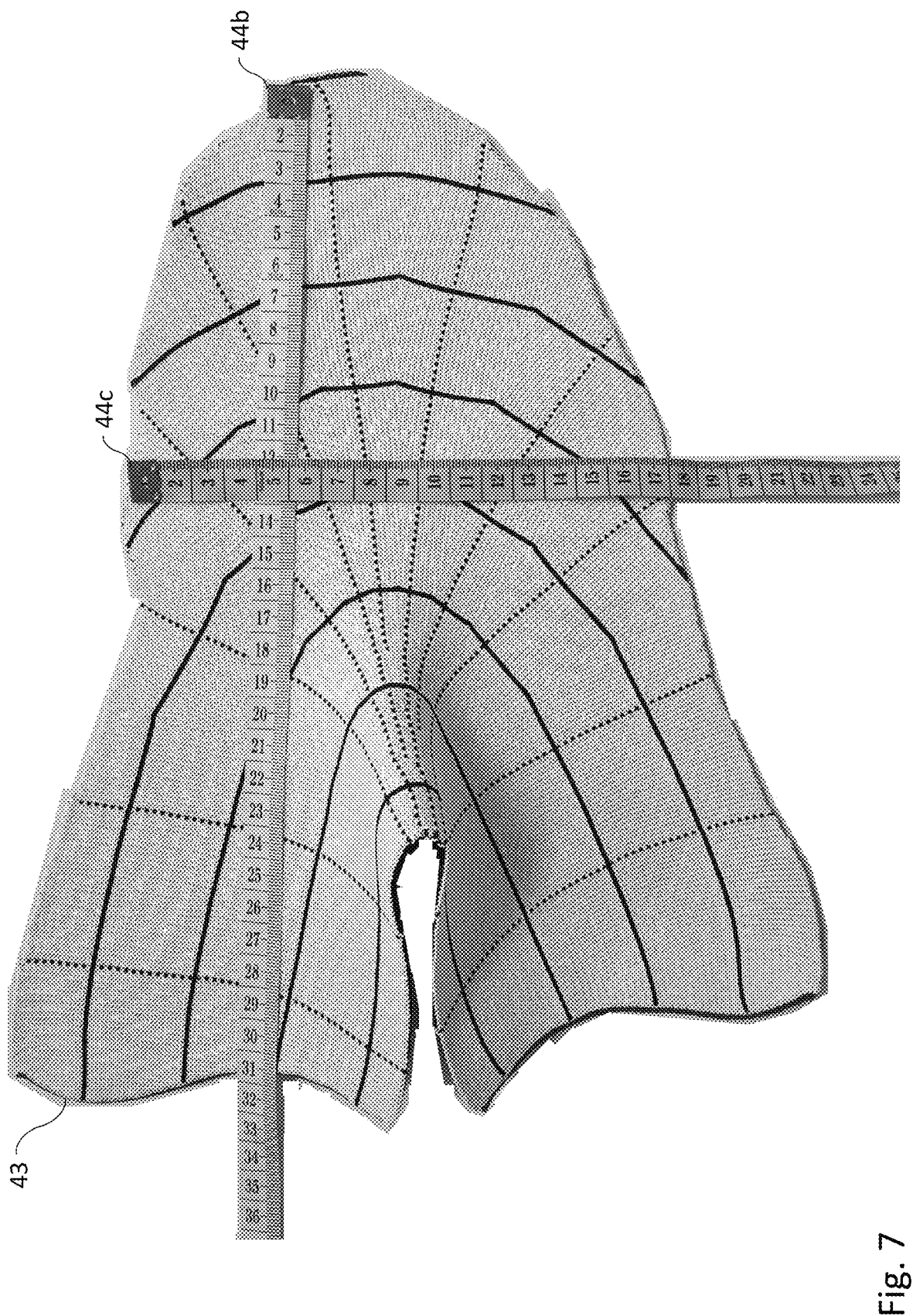
FIG. 7 depicts a top view of an example knitted article with physical reference indicators exhibited on the knitted article, in accordance with one embodiment of the invention.

FIG. 7 depicts a top view of an example knitted article 43 with physical reference indicators exhibited on the knitted article. This view provides an indication of how the inclusion of goring causes a knitted fabric to curve in three dimensions. For clarity, it is noted that the example knitted article in FIG. 7 does not correspond exactly to the 3D knit mesh 200 depicted in FIG. 2. The knitted article would more closely match the 3D knit mesh 200 depicted in FIG. 2 if the top five wales of the 3D knit mesh 200 were omitted. Nevertheless, the example knitted article 43 in FIG. 7 provides an example of how physical reference lines can be incorporated into a knitted article. Rulers 44b, 44c with units of centimeters are depicted on top of knitted article 43 to give a sense of the dimensions of knitted article 43.

Figure 8A:
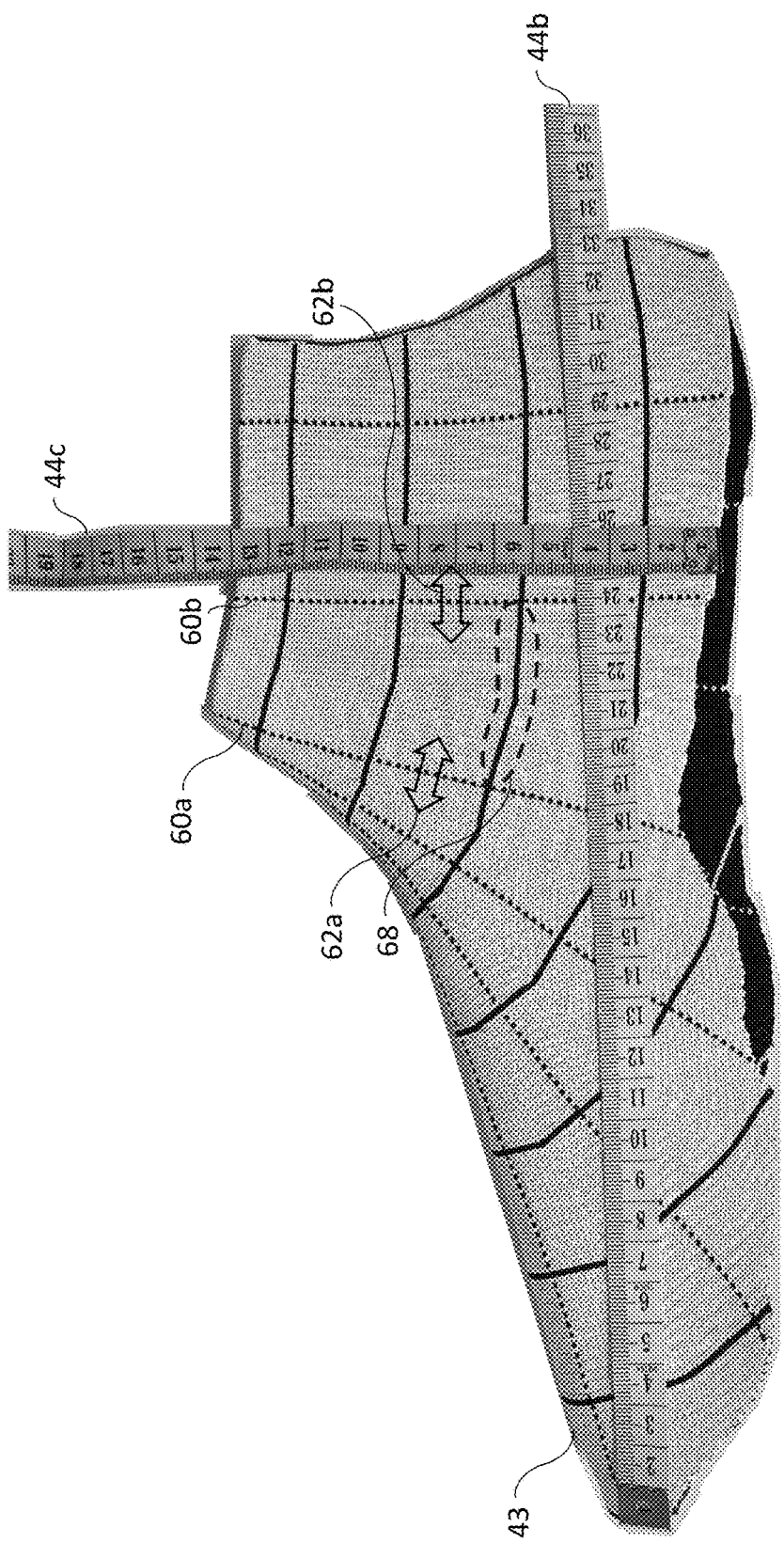
FIG. 8A depicts a side view of an example knitted article with physical reference lines exhibited on the knitted article and labels to facilitate an explanation of a physical measurement along a physical reference line (that runs along a wale) that is used to adjust a number of courses within a region (i.e., section), in accordance with one embodiment of the invention.
Figure 8B:
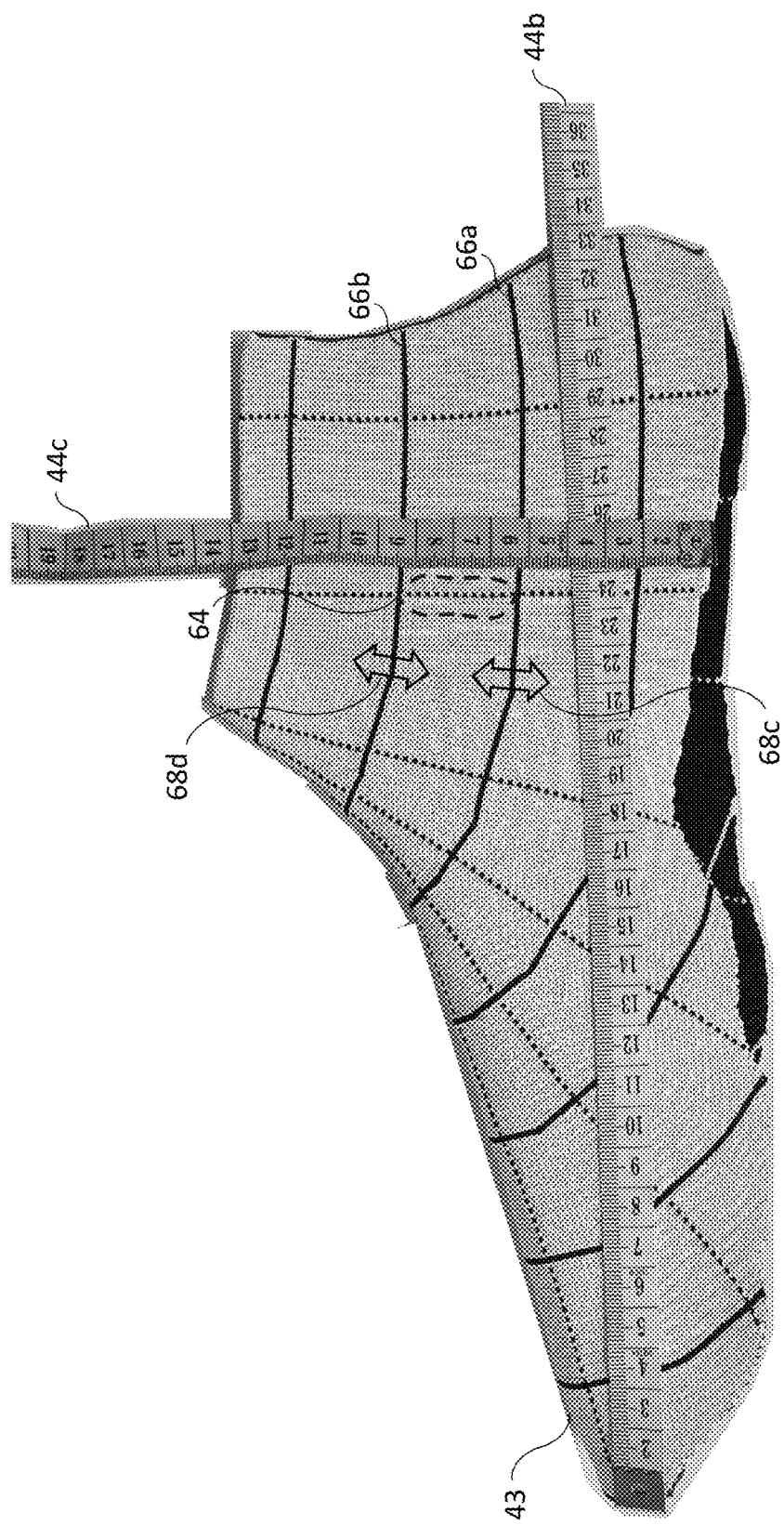
FIG. 8B depicts a side view of an example knitted article with physical reference lines exhibited on the knitted article and labels to facilitate an explanation of a physical measurement along a physical reference line (that runs along a course) that is used to adjust a number of wales within a region, in accordance with one embodiment of the invention.
Figure 8C:
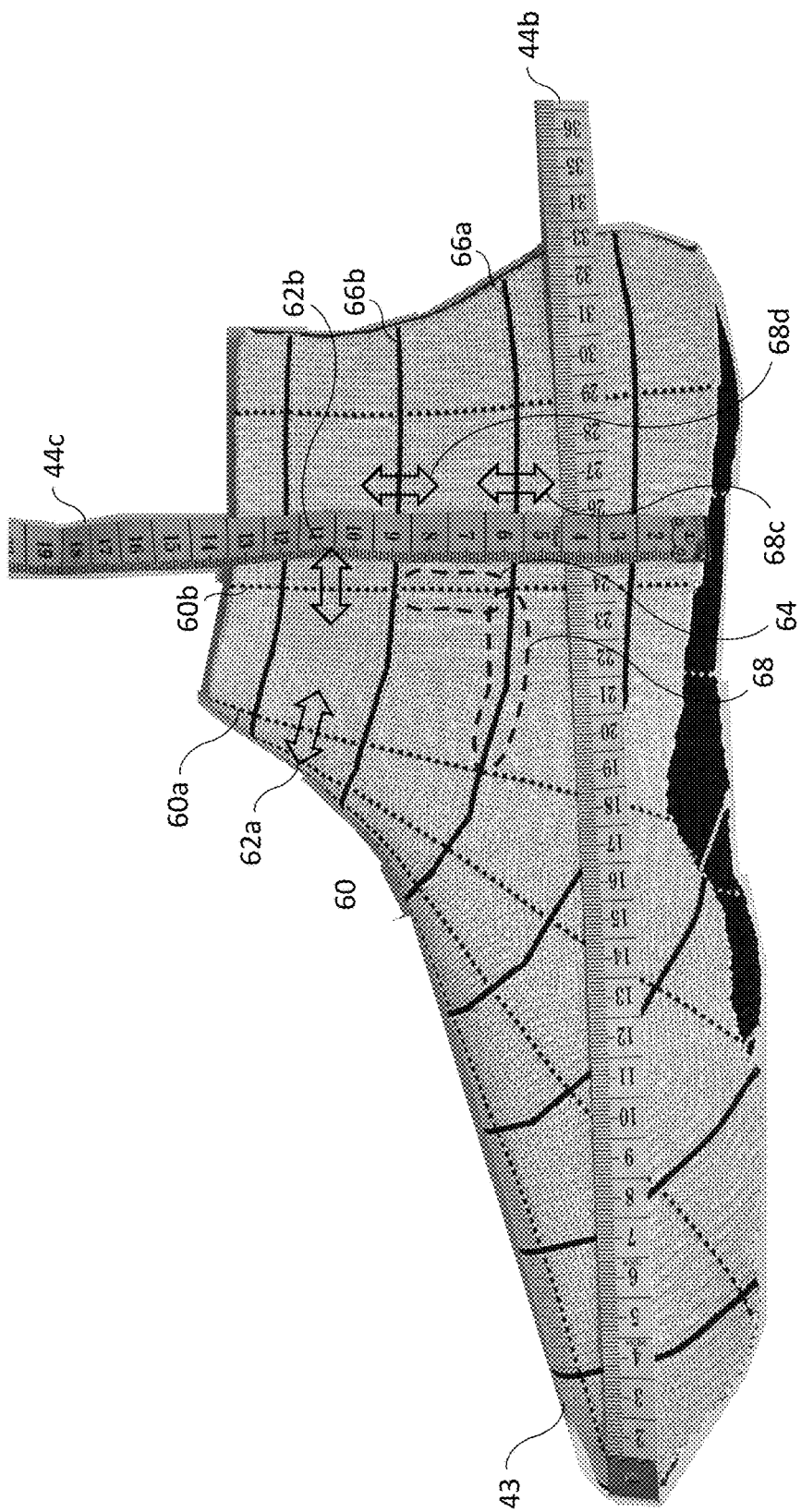
FIG. 8C depicts a side view of an example knitted article with physical reference lines exhibited on the knitted article and labels that combine the examples of FIGS. 8A and 8B, in accordance with one embodiment of the invention.

FIGS. 8A-8C depict a side view of the example knitted article 43 of FIG. 7. Indicators on FIGS. 8A-8C show how various physical measurements may be utilized to adjust the dimensions of various regions/sections of the knitted article. In FIG. 8A, a physical measurement of segment 68 along a physical reference line (that runs along a wale) may be used to adjust a number of courses (which run vertically in the orientation of FIG. 8A) between physical reference lines 60a and 60b, to the extent that the physical measurement of segment 68 deviates from a desired (or designed) length indicated in the 3D model 100. The double arrows 62a, 62b indicate that the number of courses could be increased, equivalently spacing out physical reference lines 60a and 60b, or could be decreased, equivalently moving physical reference lines 60a and 60b closer to one another.

In FIG. 8B, a physical measurement of segment 64 along a physical reference line (that runs along a course) may be used to adjust a number of wales (which run horizontally in the orientation of FIG. 8B) between physical reference lines 66a and 66b, to the extent that the physical measurement of segment 64 deviates from a desired (or designed) length indicated in the 3D model 100. The double arrows 66a, 66b indicate that the number of wales could be increased, equivalently spacing out physical reference lines 66a and 66b, or could be decreased, equivalently moving physical reference lines 66a and 66b closer to one another.

FIG. 8C combines the examples of FIGS. 8A and 8B, demonstrating that the number of wales and the number of courses may be adjusted at the same time through two physical measurements 64, 68.

FIGS. 9A and 9B return to the discussion immediately following the user interface of FIG. 6. After receiving a compensation factor of 1.3 for section 18, the application running on the computer system may modify 3D knit mesh 200 (depicted in FIG. 9A, which is also identical to that depicted in FIG. 2) to produce and display compensated 3D knit mesh 201, shown in FIG. 9B. As discussed above, the measured dimension of 5.65 cm (in FIG. 4) of the knitted article 41 exceeded the desired (or designed) dimension of 4.35 cm of the 3D model 100. As this dimension was along the direction of a wale, intuitively, the number of courses should be decreased within section 18 to bring the physical dimension (that is the size of the knitted article along the measured dimension at this location) closer to the desired (or designed) dimension. As the number of courses within a section may not be a constant number (as is the case for section 18), the adjustment of the number of courses within a section may be more specifically carried out by adjusting the number of stitches that span each wale. Two specific examples of such adjustment are illustrated in FIGS. 9A and 9B (and described in more detail with respect to FIGS. 10A and 10B below). In the first example, the 23 stitches (or 23 quads) indicated by double arrow 72a which span isoline segment 16e were adjusted into the 17 stitches (or 17 quads) indicated by double arrow 72a'. In the second example, the 26 stitches (or 26 quads) indicated by double arrow 72b which span isoline segment 16f were adjusted into the 20 stitches (or 20 quads) indicated by double arrow 72b'.

Lastly, it is noted that the edge 27a of 3D knit mesh 200 may not correspond exactly to edge 27a' of compensated 3D knit mesh 201 (observe in the illustration how edge 27a almost completely blocks the view of a portion of virtual reference line 24d, but edge 27a' hardly blocks the view of virtual reference line 24d). The discussion below in FIG. 10A will explain the transformation of edge 27a into edge 27a'.

Figure 10A:
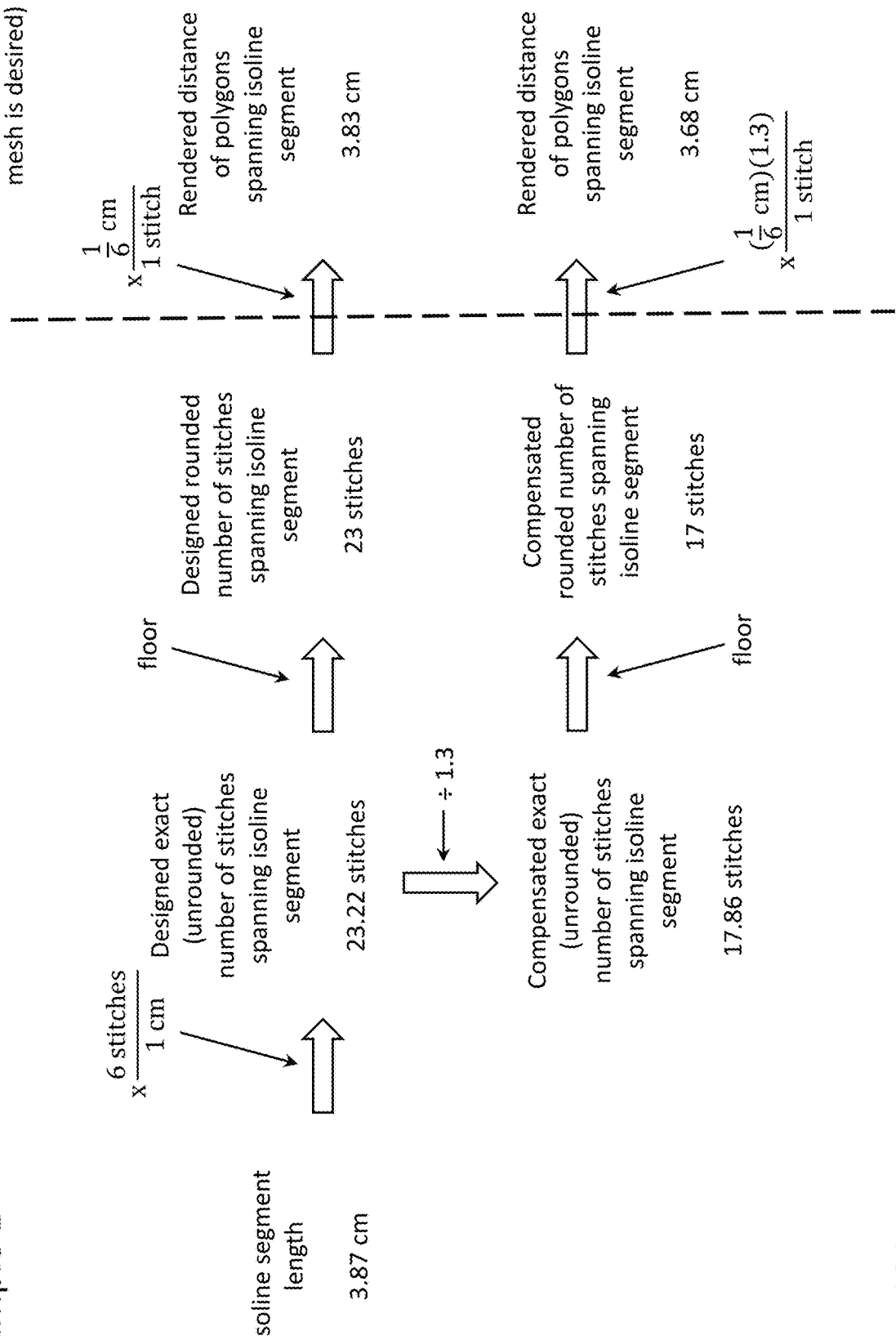
FIG. 10A depicts a first example of adjusting the number of stitches that spans an isoline segment depicted in FIG. 1B, in accordance with one embodiment of the invention.

To start off with an overview before going through the specifics, example 1 in FIG. 10A describes how the application running on the computer system arrives at 23 stitches to span isoline segment 16e, how the application running on the computer system converts the 23 stitches into the 17 stitches based on the compensation factor of 1.3. The example further explains how the 23 stitches are rendered in the 3D knit mesh 200 depicted in FIG. 9A and how the 17 stitches are rendered in the compensated 3D knit mesh 201 depicted in FIG. 9B. Regarding the determination of the number of stitches that span isoline segment 16e, the application running on the computer system may first retrieve the length of isoline segment 16e from the 3D model 100, which in the current example is 3.87 cm. In order to determine the number of stitches to assign to the isoline segment 16e (i.e., before any compensation), the length of isoline segment 16e may be multiplied by the stitch density, which in the current example is 6 stitches per centimeter. The exact (unrounded) number of stitches to assign to the isoline segment 16e is computed as 23.22 stitches (i.e., computed as the product of 3.87 cm and 6 stitches per cm). As a knitting machine can only knit a whole number of stitches, the exact (unrounded) number of stitches may then be rounded to arrive at the number of stitches to assign to the isoline segment 16e. In the example of FIG. 10A, the rounding operator used in the example of FIG. 10A is the floor operator, so 23.22 stitches is rounded to 23 stitches. Of course, other rounding operators may be used in practice, such as the conventional rounding operator in which any decimal equal or greater than 0.5 is rounded up to the nearest integer and any decimal less than 0.5 is rounded down to the nearest integer; the ceiling operator in which any non-zero decimal is rounded up to the nearest integer, etc.

If rendering of the 3D knit mesh is desired, each of the stitches may be rendered in accordance with a stitch height, stitch width or both. In the present example, since the courses run approximately vertically along the example 3D knit mesh 200, the stitch height most closely corresponds to the "width" of each of the quadrangles along a row; hence, the term "stitch height" will be used in the discussion. However, if the dimension of the height of each of the quadrangles along a column of the example 3D knit mesh 200 were of interest, the term "stitch width" would be the more appropriate term.

Since the stitch density in the current example is 6 stitches per centimeter, the stitch height is the reciprocal of the stitch density, or ⅙ cm per stitch. Finally, the rendered distance of polygons spanning the isoline segment may be computed as the number of stitches spanning the isoline segment multiplied by the stitch height. In the example of FIG. 10A, the rendered distance is 23 stitches multiplied by ⅙ cm per stitch, which equals 3.83 cm. As should be expected, the rendered distance is very similar to the original isoline segment length of 3.87 cm, with the slight deviation attributed to the intermediate rounding operation.

If compensation to the knitted article were desired, the compensation factor is preferably applied to the designed exact (unrounded) number of stitches spanning the isoline segment so that error introduced by the initial rounding operation (i.e., from 23.22 stitches to 23 stitches) does not factor into the compensation routine. More specifically, the designed exact (unrounded) number of stitches spanning the isoline segment may be divided by the compensation factor. In the example of FIG. 10A, 23.22 stitches divided by 1.3 yields 17.86 stitches. The compensated exact (unrounded) number of stitches spanning the isoline segment 16e may then be rounded to arrive at the compensated number of stitches to assign to the isoline segment 16e. The rounding operator used in the example of FIG. 10A is the floor operator, so 17.86 stitches is rounded to 17 stitches. Thus, in the new knitted article (with compensation), the knitted article will be knitted with 17 stitches to span isoline segment 16e.

In a less preferred embodiment (not depicted), it is possible for the compensation factor to instead be applied to the designed rounded number of stitches spanning the isoline segment, and then the compensated exact (unrounded) number of stitches spanning the isoline segment may similarly be rounded to arrive at the compensated rounded number of stitches that span the isoline segment. In the instant example, 23 stitches may be divided by 1.3 to arrive at 17.69 stitches, and 17.69 stitches may be rounded (i.e., floored) to arrive at 17 stitches. Thus, in the instant example, the less preferred embodiment and the more preferred embodiment both arrived at the same compensated number of stitches (i.e., 17 stitches), but this may not always be the case.

If rendering of the compensated 3D knit mesh is desired, each of the stitches spanning the isoline segment 16e may be rendered in accordance with a stitch height. In one embodiment, the original stitch height may be multiplied by the compensation factor to arrive at a compensated stitch height. It is noted that such scaling of the stitch height may not reflect the physical knitting article, in which the applied compensation does have any impact on the physical stitch height. However, it may be convenient to apply a compensation factor to the stitch height when rendering the 3D knit mesh in order to keep the dimensions of the compensated 3D knit mesh similar to the dimensions of the original 3D model. In the instant example, the scaled stitch width is computed as ⅙ cm per stitch (i.e., the original stitch height) multiplied by the compensation factor of 1.3, which yields 0.217 cm per stitch. If one looks closely at the 17 compensated stitches 72a' spanning isoline segment 16e, one will notice that the respective height of these stitches (or the width of the respective polygons) is taller (or wider) as compared to the height of each of the 23 original stitches 72a spanning isoline segment 16e.

Finally, the (new) rendered distance of polygons spanning the isoline segment 16e may be computed as the compensated number of stitches spanning the isoline segment 16e multiplied by the compensated stitch height. In the example of FIG. 10A, the rendered distance is 17 stitches multiplied by 0.217 cm per stitch, which equals 3.68 cm. The (new) rendered distance of 3.68 cm is slightly shorter than the (original) rendered distance of 3.83 cm, explaining why edge 27a' is slightly shifted over to the left, as compared to edge 27a. Such shifting of edge 27a' as compared to edge 27a does not reflect any physical manifestation of the knitted article, but rather is attributable to differences caused by the two rounding operations (i.e., rounding from 23.22 stitches to 23 stitches and the rounding of 17.86 stitches to 17 stitches). Moreover, the shifting of edge 27a' does not have any meaningful impact on the compensation routine and only shows up as a slight artifact in the renderings of the (original) and (compensated) 3D knit meshes, and is being explained for the sake of completeness.

Figure 10B:
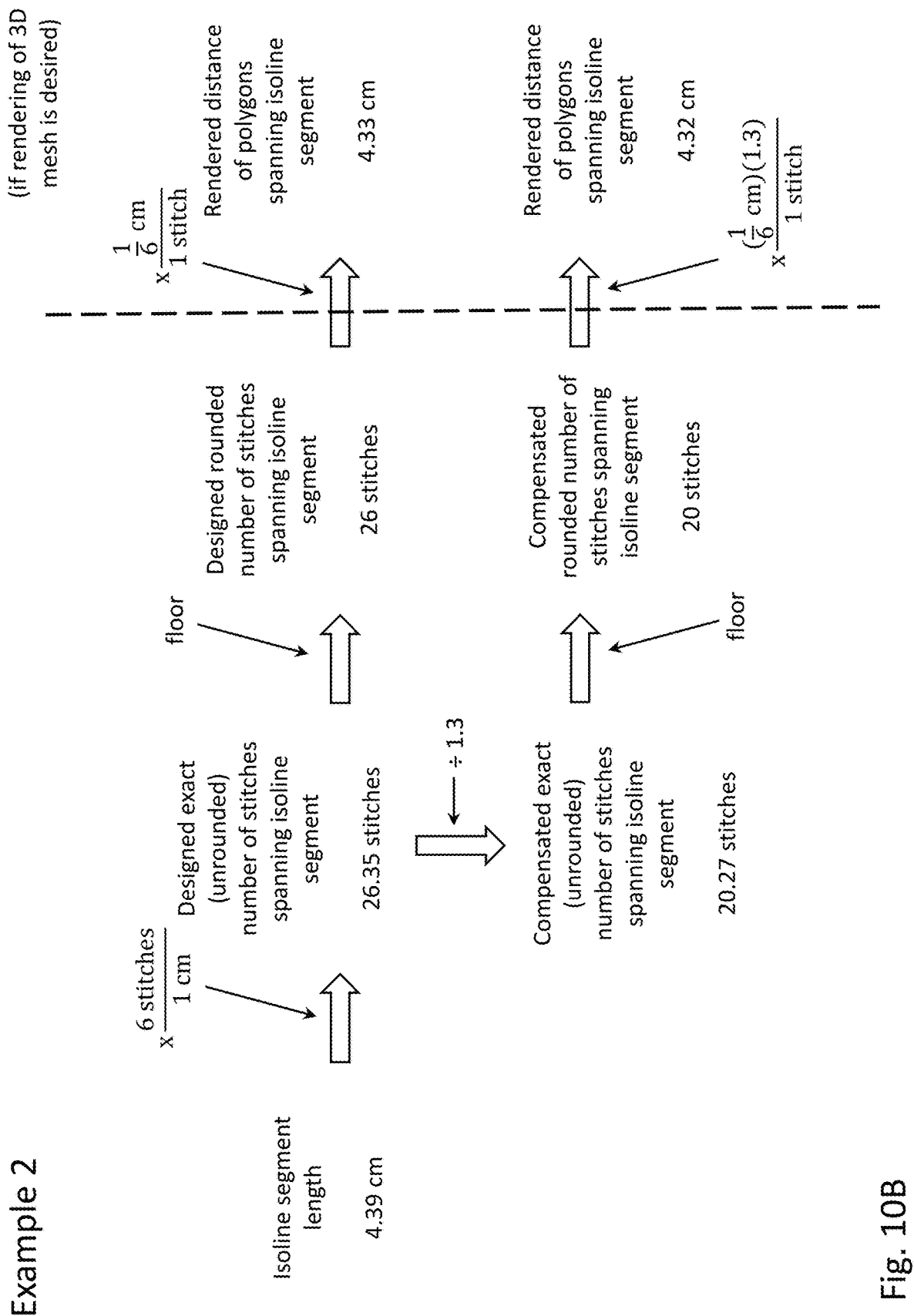
FIG. 10B depicts a second example of adjusting the number of stitches that spans an isoline segment depicted in FIG. 1B, in accordance with one embodiment of the invention.

FIG. 10B depicts a second example of adjusting the number of stitches that spans isoline segment 16f depicted in FIG. 1B. To start off with an overview before going through the specifics, example 2 in FIG. 10B describes how the application running on the computer system arrives at 26 stitches to span isoline segment 16f, how the application running on the computer system converts the 26 stitches into the 20 stitches based on the compensation factor of 1.3. The example further explains how the 26 stitches are rendered in the 3D knit mesh 200 depicted in FIG. 9A and how the 20 stitches are rendered in the compensated 3D knit mesh 201 depicted in FIG. 9B. Regarding the determination of the number of stitches to span isoline segment 16f, the application running on the computer system may first retrieve the length of isoline segment 16f from the 3D model 100, which in the current example is 4.39 cm. In order to determine the number of stitches to assign to the isoline segment 16f (i.e., before any compensation), the length of isoline segment 16f may be multiplied by the stitch density, which in the current example is 6 stitches per centimeter. The exact (unrounded) number of stitches to assign to the isoline segment 16f is computed as 26.35 stitches (i.e., computed as the product of 4.39 cm and 6 stitches per cm). As a knitting machine can only knit a whole number of stitches, the exact (unrounded) number of stitches may then be rounded to arrive at the number of stitches to assign to the isoline segment 16f. In the example of FIG. 10B, the rounding operator used is the floor operator, so 26.35 stitches is rounded to 26 stitches.

If rendering of the 3D knit mesh is desired, each of the stitches may be rendered in accordance with a stitch height. Since the stitch density is the current example is 6 stitches per centimeter, the stitch height is the reciprocal of the stitch density, or ⅙ cm per stitch. Finally, the rendered distance of polygons spanning the isoline segment may be computed as the number of stitches spanning the isoline segment multiplied by the stitch height. In the example of FIG. 10B, the rendered distance is 26 stitches multiplied by ⅙ cm per stitch, which equals 4.33 cm. As should be expected the rendered distance is very similar to the original isoline segment length of 4.39 cm, with the slight deviation attributed to the intermediate rounding operation.

If compensation to the knitted article is desired, the compensation factor is preferably applied to the designed exact (unrounded) number of stitches spanning the isoline segment. More specifically, the designed exact (unrounded) number of stitches spanning the isoline segment may be divided by the compensation factor. In the example of FIG. 10B, 26.35 stitches divided by 1.3 yields 20.27 stitches. The compensated exact (unrounded) number of stitches spanning the isoline segment may then be rounded to arrive at the compensated number of stitches to assign to the isoline segment 16f. The rounding operator used in the example of FIG. 10B is the floor operator, so 20.27 stitches is rounded to 20 stitches. Thus, in the new knitted article (with compensation), the knitted article will be knitted with 20 stitches to span isoline segment 16f.

If rendering of the compensated 3D knit mesh 201 is desired, each of the stitches spanning isoline segment 16f may be rendered in accordance with a stitch height. In one embodiment, the original stitch height may be multiplied by the compensation factor to arrive at a compensated stitch height. In the instant example, the scaled stitch height is computed as ⅙ cm per stitch (i.e., the original stitch height) multiplied by the compensation factor of 1.3, which yields 0.217 cm per stitch. If one looks closely at the 20 compensated stitches $72b'$ spanning isoline segment $16f$, one will notice that the height of these stitches (or the width of the respective polygons) is taller (or wider) as compared to the height of each of the 26 original stitches $72b$ spanning isoline segment $16f$.

Finally, the (new) rendered distance of polygons spanning the isoline segment $16f$ may be computed as the compensated number of stitches spanning the isoline segment $16f$ multiplied by the compensated stitch height. In the example of FIG. 10B, the rendered distance is 20 stitches multiplied by 0.217 cm per stitch, which equals 4.32 cm. The (new) rendered distance of 4.32 cm is approximately equal to the (original) rendered distance of 4.33 cm, explaining why the position of edge $27b'$ (in FIG. 9B) looks almost identical to the position of edge $27b$ (in FIG. 9A).

FIG. 3B depicts the compensated 2D knitting map 301 which may be generated from the compensated 3D knit mesh 201. A visual comparison will reveal that the main difference between 2D knitting map 300 and the compensated 2D knitting map 301 is a reduction in the number of courses in the bottom-most section of the compensated 2D knitting map 301. For clarity, the height, $h_1$, of the bottom-most section of the 2D knitting map 300, and the height, $h_2$, of the bottom-most section of the compensated 2D knitting map 301 have been annotated, with height $h_2$ being less than height $h_1$. Intuitively, this compensation of 2D knitting map 301 should make sense as the physical measurement of 5.65 cm along physical reference line segment 46 was too long, so the compensated knitted article should have a fewer number of courses in section 18 to better match the desired virtual measurement of 4.35 cm along isoline segment $16d$. It should be understood that the process would continue with updated knitting instructions being generated from the compensated 2D knitting map 301 and a new knitted article being knit by the knitting machine based on the updated knitting instructions. For the sake of conciseness, an image of such new knitted article is not shown herein, but it would appear similar to knitted article 41 depicted in FIG. 4, except that a few courses would be omitted from section 18.

Figure 11:
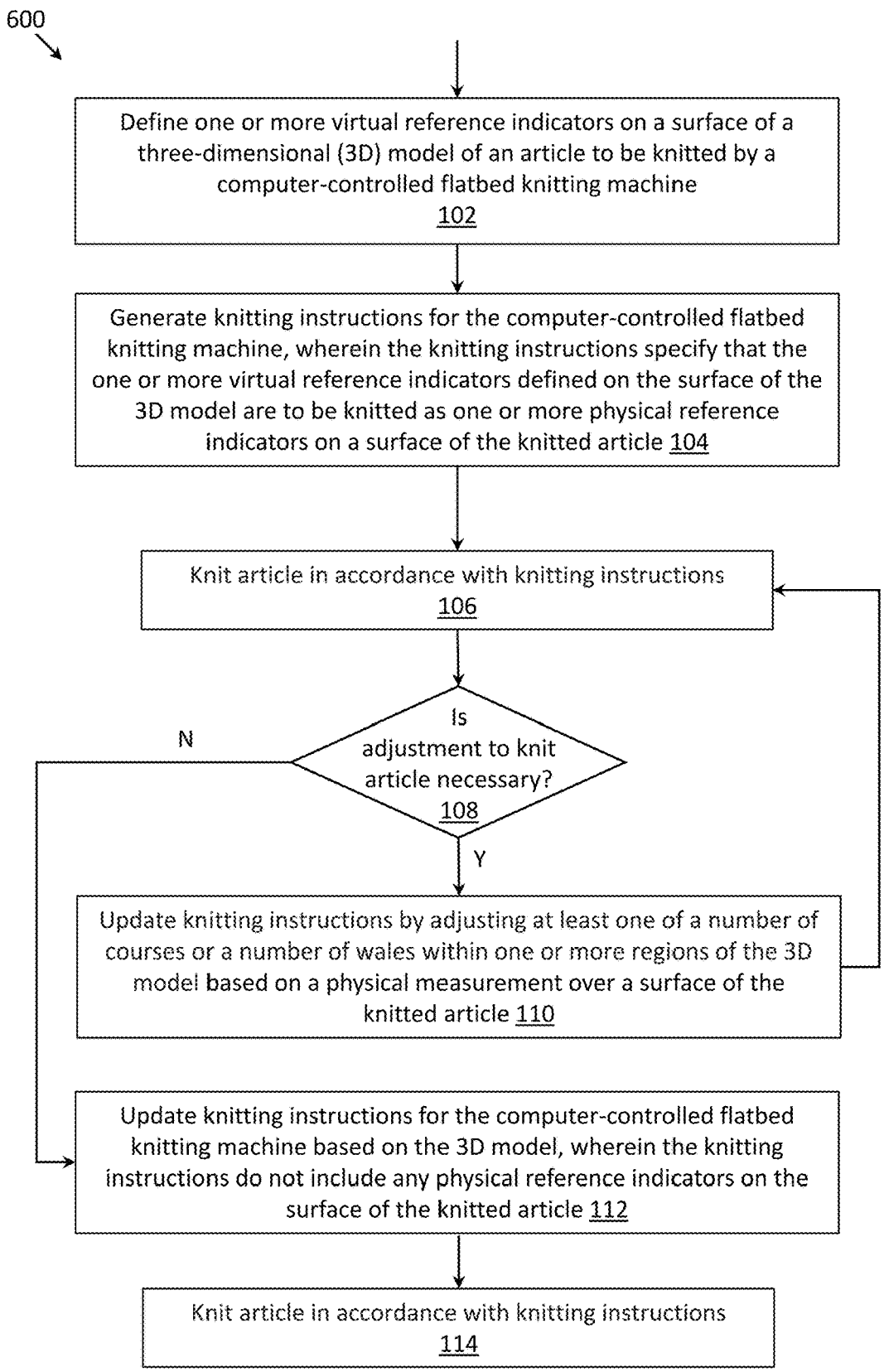
FIG. 11 depicts a flow diagram of a process to update knitting instructions based on a physical measurement over a surface of a knitted article knitted in accordance with the knitting instructions, in accordance with one embodiment of the invention.

FIG. 11 depicts a flow diagram 600 of a process to update knitting instructions based on a physical measurement over a surface of a knitted article knitted in accordance with the knitting instructions. In step 102, the computer system may define one or more virtual reference indicators on a surface of a 3D model of an article to be knitted by a computer-controlled flatbed knitting machine. Such step was described above in association with FIG. 1A (in which reference numerals $14a$, $14b$, $14c$, $14d$ indicated a first set of virtual reference indicators) and FIG. 1D (in which reference numerals $20a$, $20b$, $20c$, $20d$ and $20e$ indicated a second set of virtual reference indicators). In step 104, the application running on the computer system may generate knitting instructions for the computer-controlled flatbed knitting machine based on the 3D model. The knitting instructions may specify that the one or more virtual reference indicators defined on the surface of the 3D model are to be knitted as one or more physical reference indicators that are visible on a surface of or otherwise as a part the knitted article. Step 104 may involve the generation of 3D knit mesh 200 from the 3D model 100 (as depicted above in FIG. 2), the generation of a 2D knitting map 300 from the 3D knit mesh 200 (as depicted in FIG. 3A), and finally, the generation of knitting instructions from the 2D knitting map 300. In step 106, the knitting instructions may be sent to a flatbed knitting machine, which then knits an article in accordance with the knitting instructions.

At step 108, a user may determine whether any adjustment to the knit article is necessary. Such determination may involve the user taking one or more physical measurements along the physical reference indicators that are visible on a surface of the knitted article, and comparing the one or more physical measurement with the designed (or desired) dimensions of the 3D model 100.

If no adjustment is necessary (i.e., "No" branch of step 108), the previous knitting instructions may be modified to remove the physical reference indicators that are visible on the surface of the knitted article (step 112), and an article may be knit in accordance with the modified knitting instructions (step 114). If adjustment is necessary ("yes" branch of step 108), the previous knitting instructions may be modified by adjusting at least one of a number of courses or a number of wales within one or more regions of the 3D model based on one or more physical measurements over the surface of the knitted article (step 110). From step 110, the process then continues to step 106 in which a knitting machine is used to knit the knitted article in accordance with the modified knitting instructions.

Figure 12:
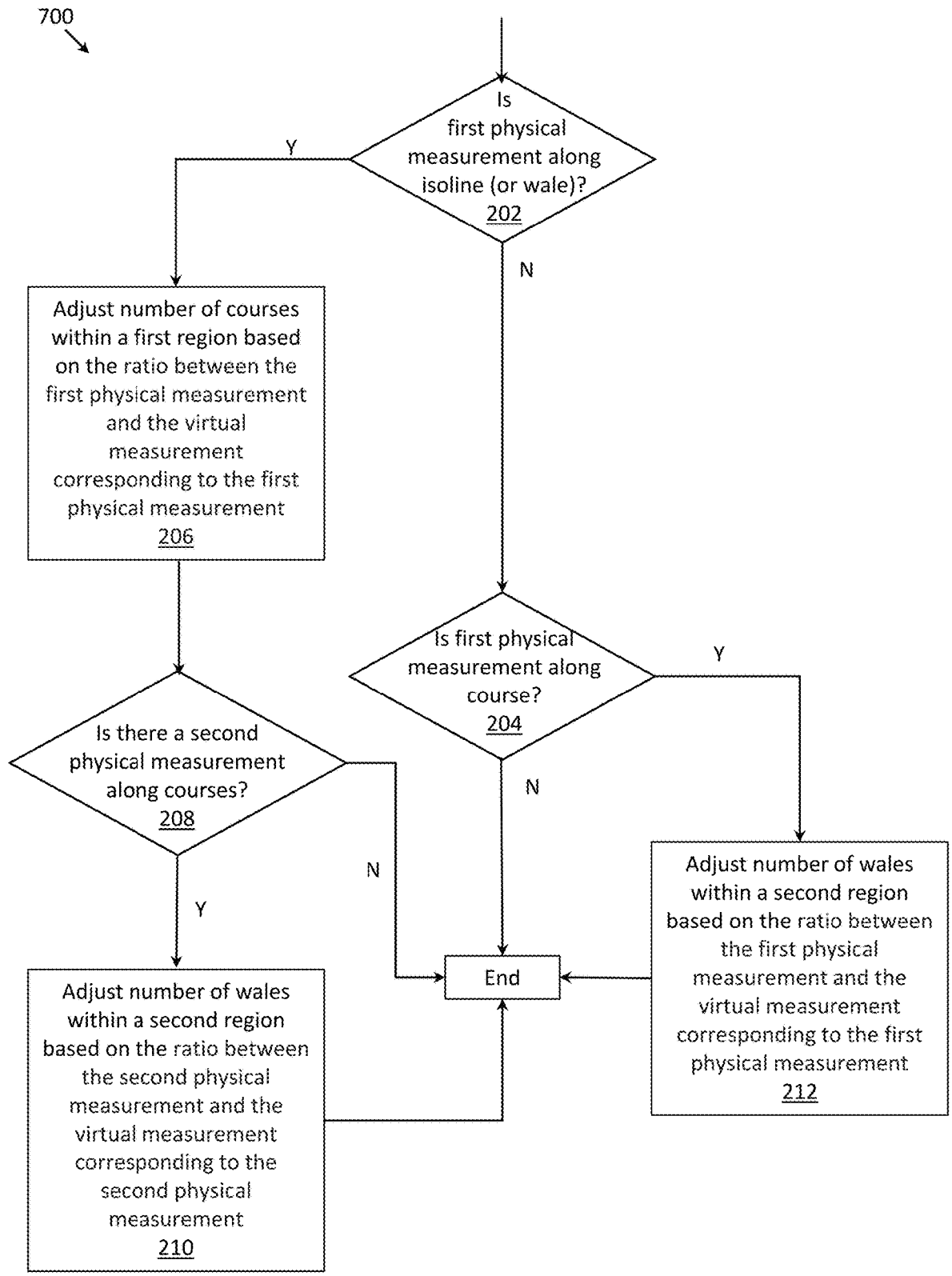
FIG. 12 depicts a flow diagram with additional details on how to utilize the physical measurement to update the knitting instructions, in accordance with one embodiment of the invention.

FIG. 12 depicts flow diagram 700 with additional details regarding step 110 on how to utilize one or more physical measurements to update the knitting instructions. At step 202, the application running on the computer system may determine whether a first physical measurement is along an isoline (or equivalently, a wale). If so ("yes" branch of step 202), the computer system may adjust a number of courses within a first region based the first physical measurement, as previously discussed in FIG. 8A. More specifically, the application running on the computer system may adjust a number of courses within the first region based on a ratio between the first physical measurement and a virtual measurement corresponding to the first physical measurement, as previously discussed in association with the compensation factor of 1.3 in FIGS. 6, 9A, 9B, 10A and 10B. The phrase "virtual measurement" may correspond to the previously discussed designed (or desired) length of a segment (e.g., isoline segment) on the 3D model 100.

If not ("no" branch of step 202), the computer system may determine whether a first physical measurement is along a course. If so ("yes" branch of step 204), the application running on the computer system may adjust a number of wales within a second region based the first physical measurement, as previously discussed in FIG. 8B. More specifically, the application running on the computer system may adjust a number of wales within the second region based on a ratio between the first physical measurement and a virtual measurement corresponding to the first physical measurement. No specific example for the adjustment of the number of wales is being provided; however, it is expected that the reader will be able to apply the previously discussed concepts concerning the adjustment of the number of courses to the adjustment of the number of wales.

Following step 206, the computer system may further check whether there is a second physical measurement along a course. If so ("yes" branch of step 208), the computer system may further adjust a number of wales within a second region based the second physical measurement, as previously discussed in FIG. 8C. More specifically, the application running on the computer system may adjust a number of wales within the second region based on a ratio between the second physical measurement and a virtual measurement corresponding to the second physical measurement.

Following any of steps 210, 212, "no" branch of step 204 or "no" branch of step 208, no further adjustment to the knitting instructions may be performed in step 110.

Figure 13:
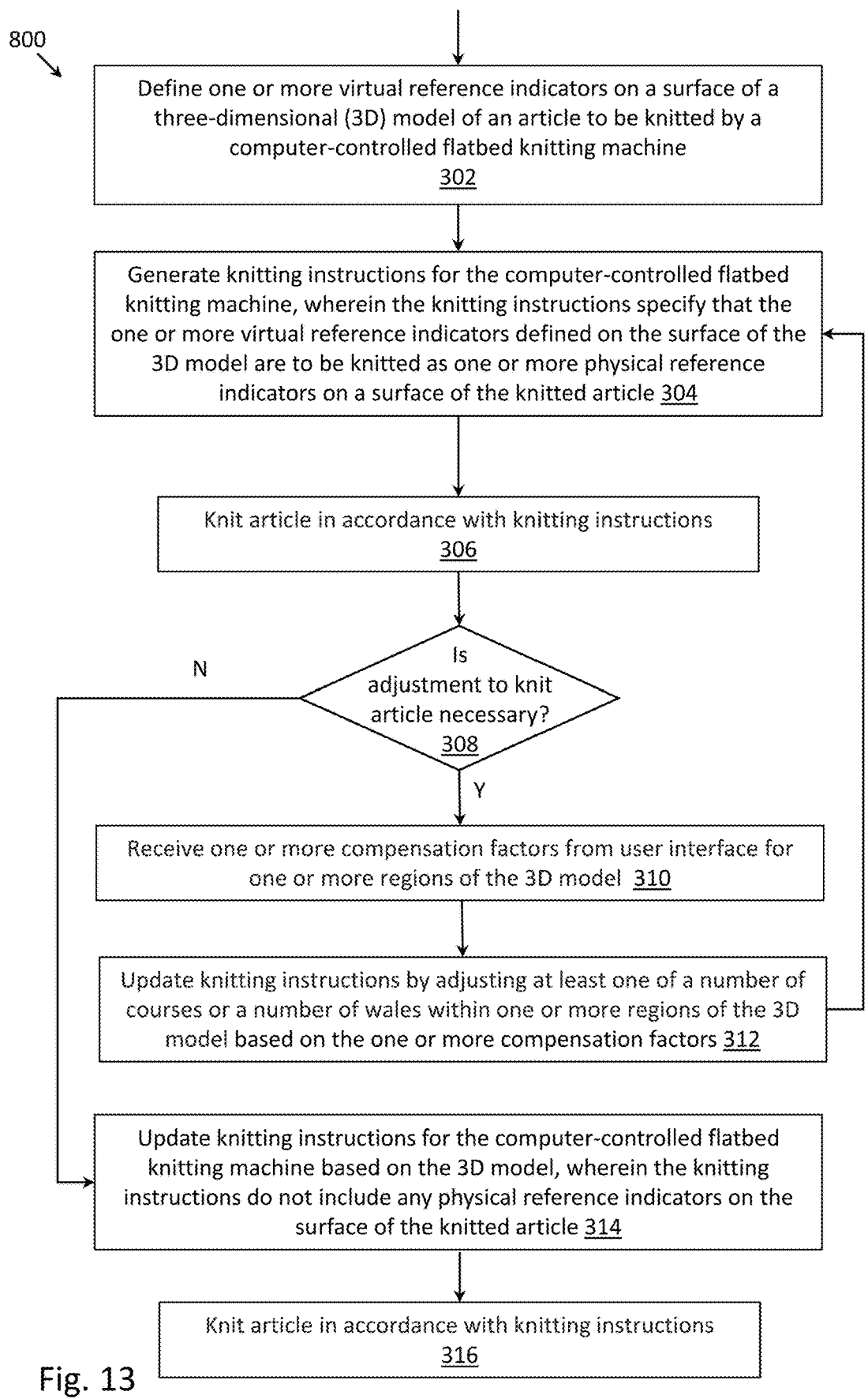
FIG. 13 depicts a flow diagram of a process to update knitting instructions based on one or more compensation factors received from a user interface for one or more regions of the 3D model, in accordance with one embodiment of the invention.

FIG. 13 depicts a flow diagram 800 of a process to update knitting instructions based on one or more compensation factors received from a user interface for one or more regions of the 3D model. Steps 302, 304, 306, 314 and 316 are identical to steps 102, 104, 106, 112 and 114 previously described in FIG. 11, respectively, so the description of these steps will not be repeated for the sake of conciseness.

At step 308, a user may determine whether any adjustment to the knit article is necessary. Such determination may involve the user taking one or more physical measurements along the physical reference indicators that are visible on a surface of the knitted article, and comparing the one or more physical measurement with the designed (or desired) dimensions of the 3D model 100.

If no adjustment is necessary (i.e., "No" branch of step 308), the previous knitting instructions may be modified to remove the physical reference indicators that are visible on the surface of the knitted article (step 314), and an article may be knit in accordance with the modified knitting instructions (step 316). If adjustment is necessary ("yes" branch of step 308), the application running on the computer system may receive one or more compensation factors via the user interface for one or more regions of the 3D model (step 310). An example of the user interface was previously described in connection with FIG. 6. As previously described, the one or more compensation factors may include a respective ratio for one or more regions (or sections) of the 3D model, in which each of the one or more ratios may be computed as a measured physical distance divided by the designed (or desired) dimension corresponding to the measured physical distance.

At step 312, the computer system may update knitting instructions by adjusting at least one of a number of courses or a number of wales within one or more regions of the 3D model based on the one or more compensation factors. An adjustment of the number of courses based on the compensation factor of 1.3 was previously discussed in association with FIGS. 6, 9A, 9B, 10A and 10B. No specific example for the adjustment of the number of wales is being provided; however, it is expected that the reader will be able to apply the previously discussed concepts concerning the adjustment of the number of courses to the adjustment of the number of wales. The remainder of flow diagram 800 is similar to flow diagram 600 so the description will not be repeated for the sake of conciseness.

Figure 14:
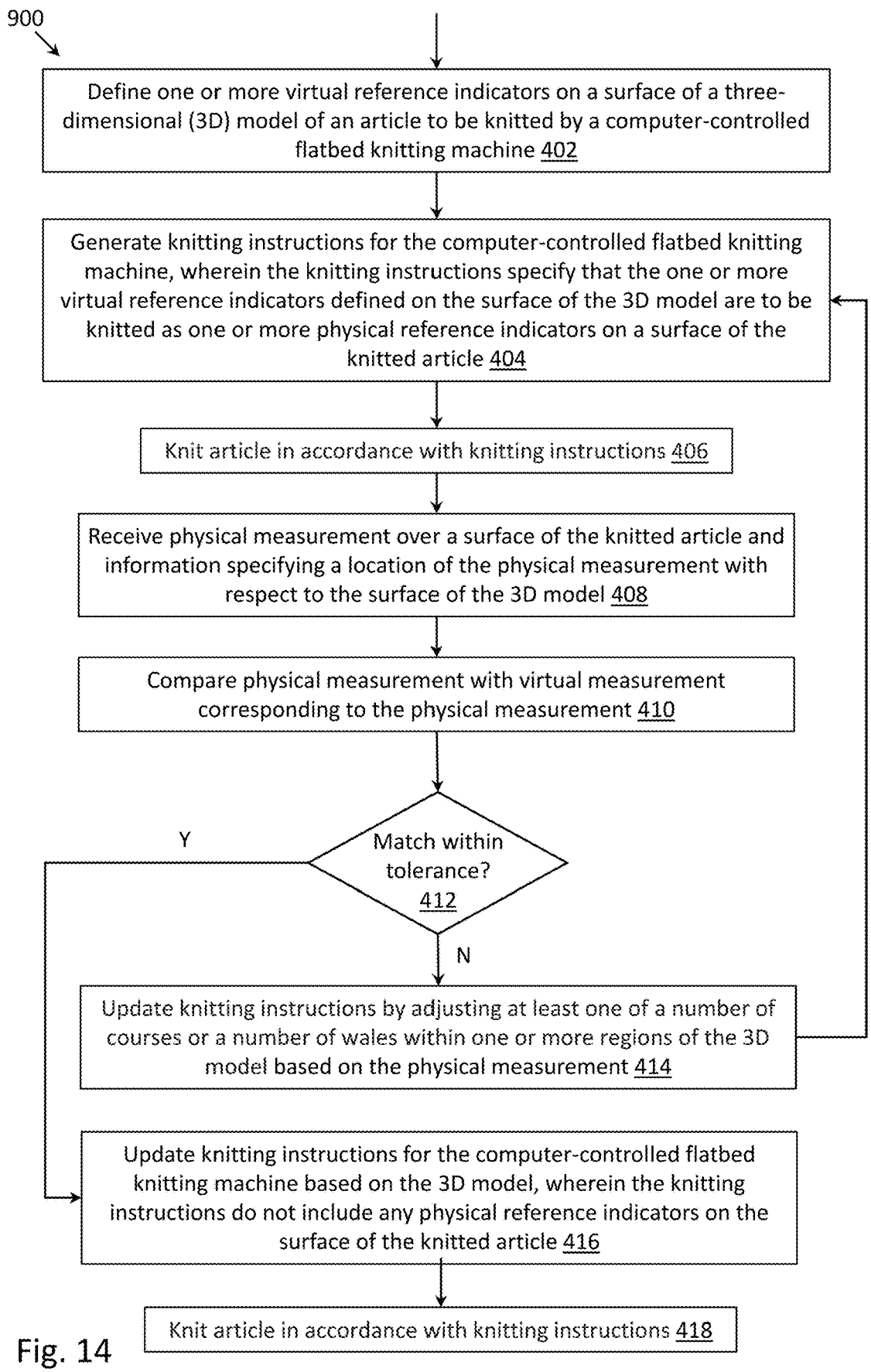
FIG. 14 depicts a flow diagram of a variant of the process depicted in FIG. 13, in which the physical measurement is received from a user interface, in accordance with one embodiment of the invention.

FIG. 14 depicts a flow diagram 900 of a variant of the process depicted in FIG. 13, in which the physical measurement (as opposed to the compensation ratio) is received from a user interface. Steps 402, 404, 406, 414, 416 and 418 are identical to steps 102, 104, 106, 110, 112 and 114 previously described in FIG. 11, respectively, so the description of these steps will not be repeated for the sake of conciseness. At step 408, the user interface of the application running on the computer system may receive a physical measurement over a surface of the knitted article and information specifying a location of the physical measurement with respect to the surface of the 3D model. While such user interface has not been depicted, a user interface similar to that shown in FIG. 5 in which a cursor control device may be used to select a segment along one of the first set of reference lines 24a, 24b, 24c or along one of the second set of reference lines 26a, 26b, 26c, 26d, 26e may be used. In addition to or instead of displaying the designed (desired) length along that segment, the application running on the computer system can display a textbox to accept the physical measurement of that selected segment. As another example, a user interface similar to that shown in FIG. 2 in which a cursor control device may be used to indicate two reference points on the 3D knit mesh 200, followed by the application running on the computer system displaying a textbox to accept the physical measurement between those two indicated reference points may be used.

At step 410, the application running on the computer system may compare the physical measurement with the virtual measurement corresponding to the physical measurement. For example, if the user were to input the physical measurement of 5.65 cm for region 50 corresponding to physical reference line segment 46, the application running on the computer system may compare the physical measurement of 5.65 cm to the virtual measurement of 4.35 cm.

At step 412, the application running on the computer system may determine whether the physical measurement and virtual measurement match within a tolerance. For example, the tolerance could be a maximum absolute difference between the physical and virtual measurements (e.g., 0.1 cm, 0.01 cm, etc.); the tolerance could be a maximum percentage of the absolute difference between the physical and virtual measurements relative to one of the physical measurement or the virtual measurement (e.g., 10%, 5%, 1%, etc.), or the tolerance could include a minimum and maximum ratio between the physical and the virtual measurement.

For the example above in which the physical measurement was 5.65 cm and the virtual measurement was 4.35 cm, the ratio between the physical measurement and the virtual measurement was 1.3. If the minimum and maximum ratio were 0.9 and 1.1, respectively, the computed ratio of 1.3 would exceed the maximum ratio of 1.1 and hence, the physical and virtual measurements would not match within a tolerance in the instant example. If the physical and virtual measurements do not match within a tolerance ("no" step of step 412), the application running on the computer system may perform step 414, which may be identical to previously described step 110. If the physical and virtual measurements do match within a tolerance ("yes" step of step 412), the application running on the computer system may perform step 416, which may be identical to previously described step 112. The remainder of flow diagram 900 is similar to flow diagram 600 so the description will not be repeated for the sake of conciseness.

Figure 15A:
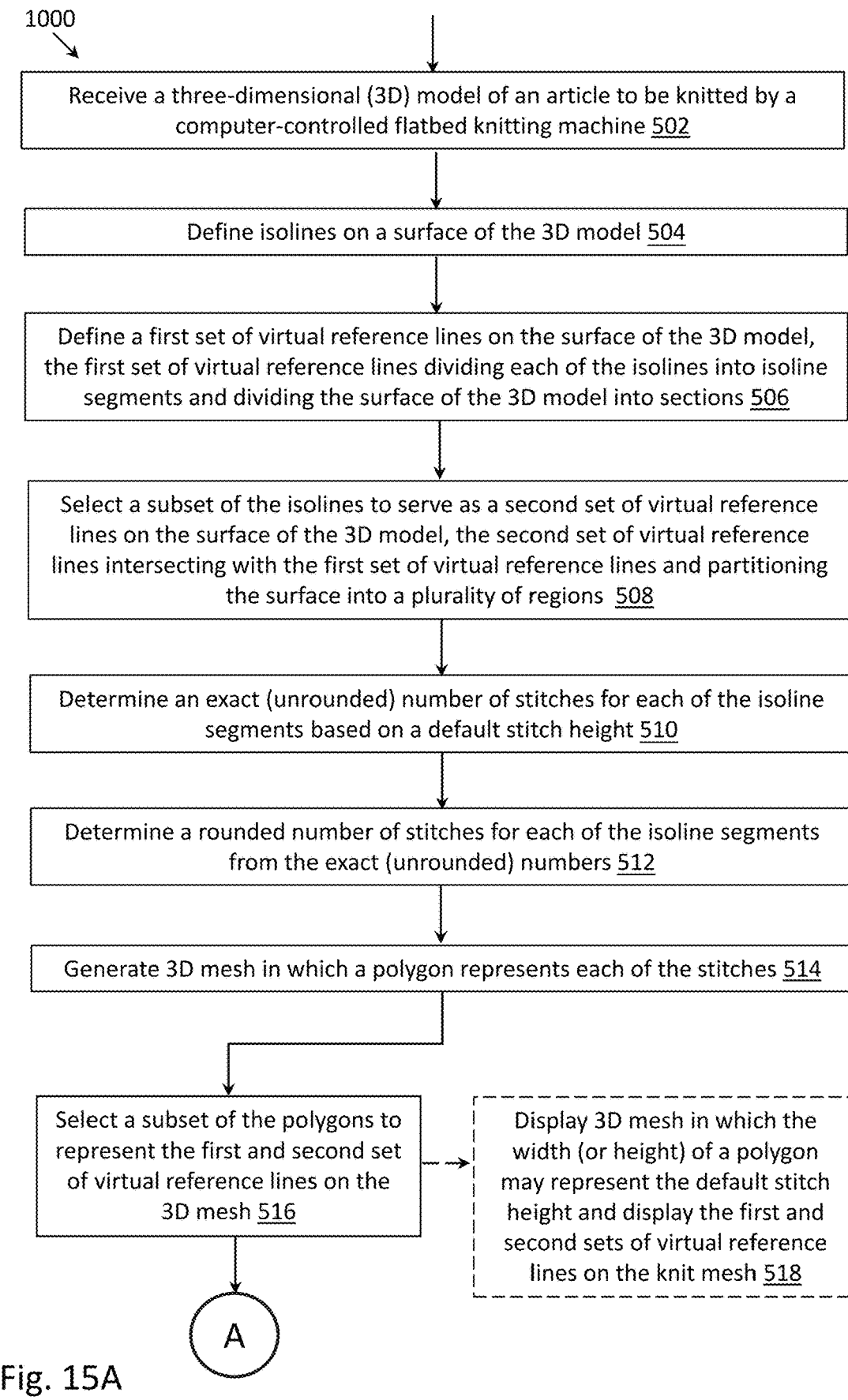
FIGS. 15A-15C depict a flow diagram of a lower level process to update knitting instructions based on a one or more compensation factors received from a user interface for one or more regions of the 3D model, in accordance with one embodiment of the invention.
Figure 15B:
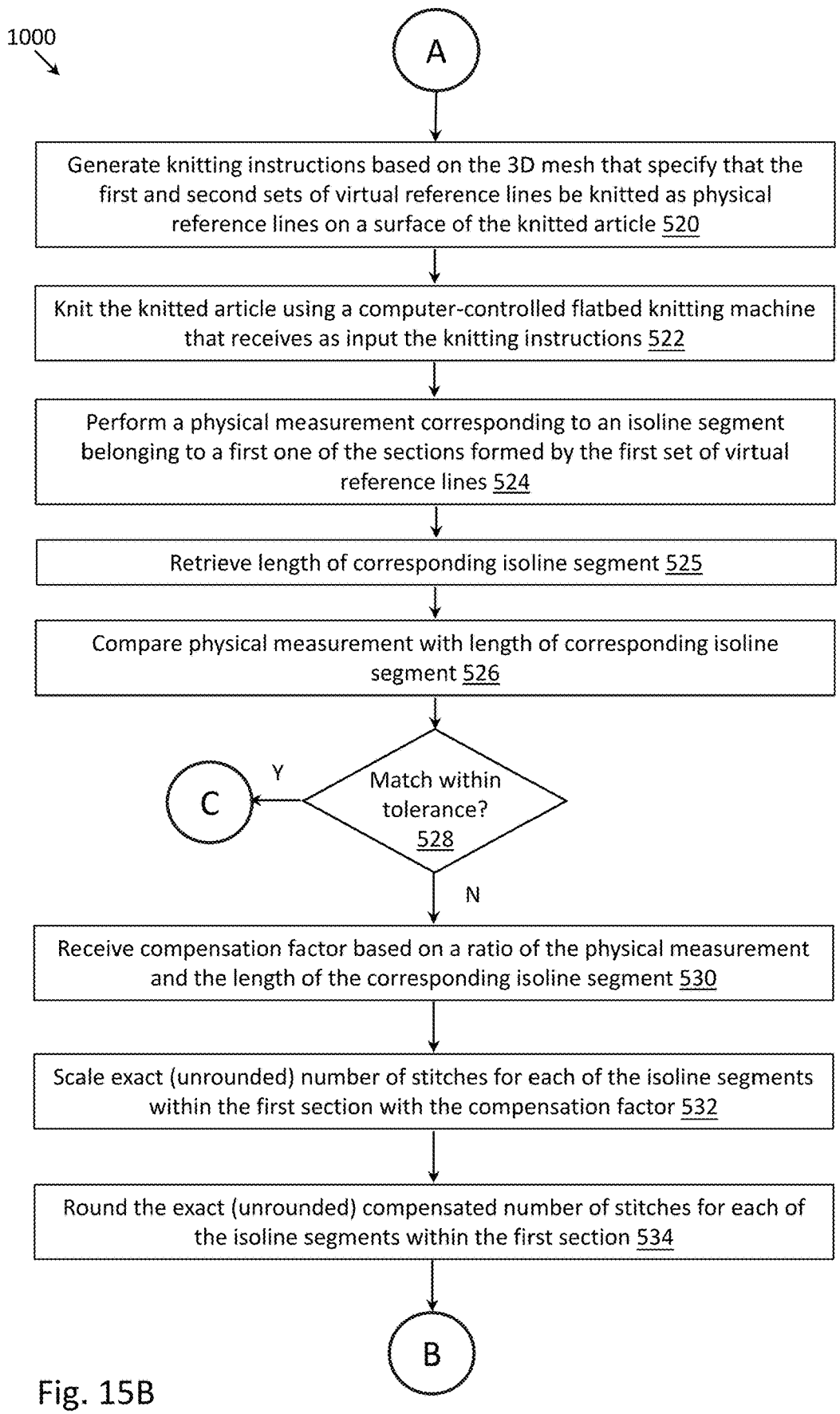
Figure 15C:
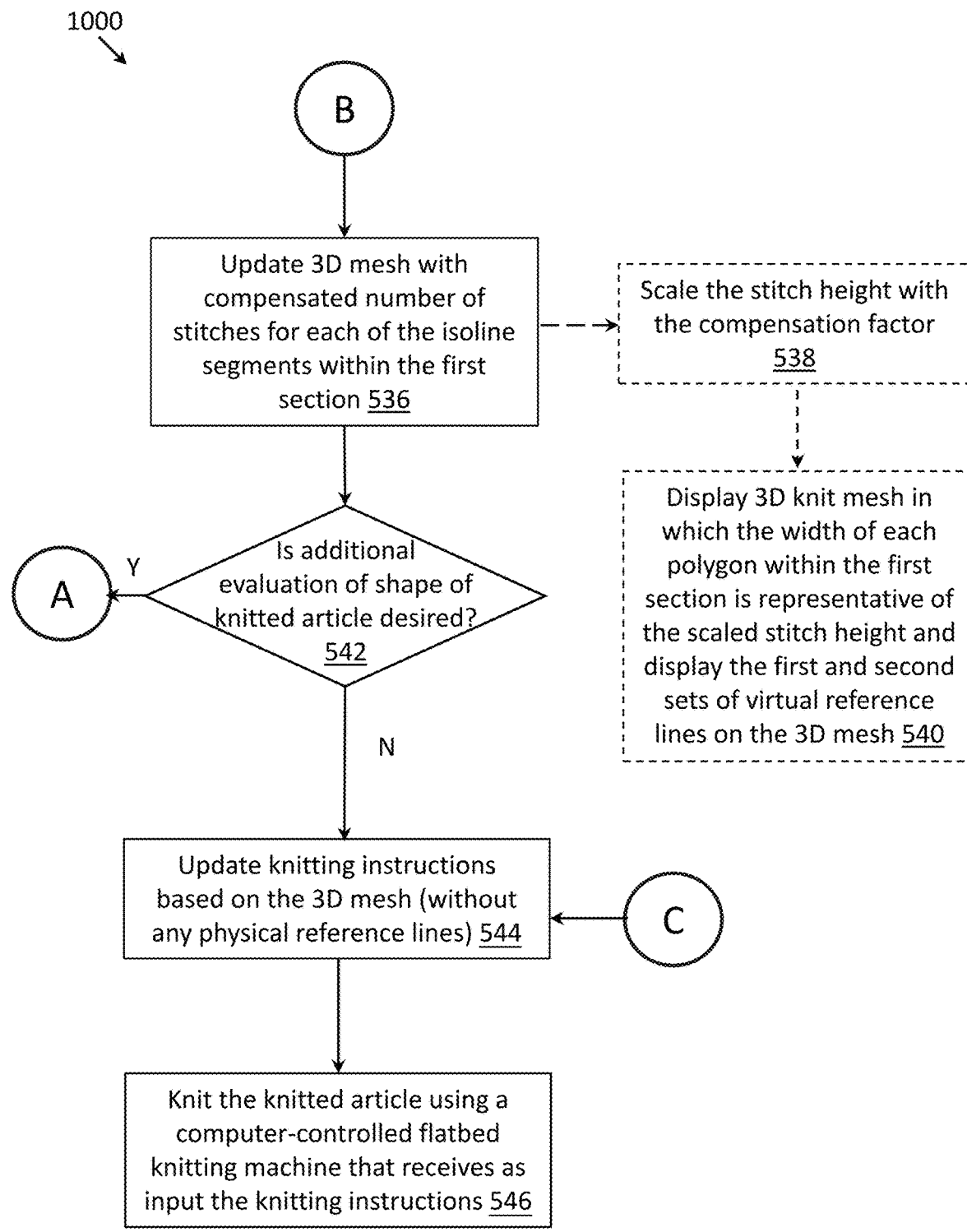

FIGS. 15A-15C depict a flow diagram 1000 of a lower level process to update knitting instructions based on one or more compensation factors received from a user interface for one or more regions of the 3D model. At step 502, the application running on the computer system may receive a 3D model of an article to be knitted by a computer-controlled flatbed knitting machine. An example of a 3D model 100 was depicted in FIG. 1A. To clarify, the 3D model 100 that is initially received may not include any isolines and/or virtual reference lines and hence, more precisely, an example of a 3D model that is received by the application running on the computer system may be 3D model 100, less the isolines (e.g., 12a, 12b, 12c), and the first set of virtual reference indicators (e.g., 14a, 14b, 14c).

At step 504, the application running on the computer system may define isolines on a surface of the 3D model. An example of isolines was provided FIG. 1A. As the process for defining isolines is known in the art, step 504 will not be described in detail. For additional information regarding the definition of isolines, see for example US 2023/0357969 to Samosir et al.

At step 506, the application running on the computer system may define a first set of virtual reference lines on the surface of the 3D model, the first set of virtual reference lines dividing each of the isolines into isoline segments and dividing the surface of the 3D model into sections. An example of step 506 was discussed in FIG. 1B above, in which a first set of virtual reference lines 14a, 14b, 14c divided isoline 12c into isoline segments 16a, 16b, 16c. An example of step 506 was also discussed in FIG. 1C above, in which the 3D model 100 was divided into sections, including section 18.

At step 508, the application running on the computer system may select a subset of the isolines to serve as a second set of virtual reference lines on the surface of the 3D model, the second set of virtual reference lines intersecting with the first set of virtual reference lines and partitioning the surface into a plurality of regions. An example of step 508 was discussed in FIG. 1D above, in which a second set of virtual reference lines 20a, 20b, 20c, 20d, 20e intersected with the first set of virtual reference lines 14a, 14b, 14c, and the first and second sets of virtual reference lines partitioned the surface of the 3D model 100 into a plurality of regions, with one of the regions 21 being indicated in FIG. 1D.

At step 510, the application running on the computer system may determine an exact (unrounded) number of stitches for each of the isoline segments based on a default stitch height. Two examples of step 510 were provided above in FIGS. 10A and 10B, in which the exact (unrounded) number of stitches for isoline segments 16e and 16f was determined to be 23.22 and 26.35 stitches, respectively.

At step 512, the application running on the computer system may determine a rounded number of stitches for each of the isoline segments from the exact (unrounded) numbers. Two examples of step 512 were provided above in FIGS. 10A and 10B, in which the rounded number of stitches for isoline segments 16e and 16f was determined as 23 and 26 stitches, respectively.

At step 514, the application running on the computer system may generate a 3D knit mesh in which a polygon represents each of the stitches. An example of step 514 was provided in FIG. 2, in which 3D knit mesh 200 included a plurality of polygons, each of which represented a single stitch. In another embodiment, each polygon may more generally correspond to n stitches of the knitted article, in which n is a natural number.

At step 516, the application running on the computer system may select a subset of the polygons to represent the first and second set of virtual reference lines on the 3D knit mesh. In one embodiment, step 516 may be performed by determining which ones of the polygons of the 3D knit mesh substantially overlap (e.g., overlap 75%, 90%, 95%) with virtual reference lines (e.g., from the first and second sets) on the 3D model 100. In such selection procedure, the virtual reference lines from the first and second sets may each be represented with a width that substantially corresponds to the stitch height. An example of step 516 was provided in FIG. 2, in which the polygons along dashed (vertical) lines 24a, 24b, 24c were selected to represent the first set of virtual reference lines, and the polygons along solid (horizontal) lines 26a, 26b, 26c, 26d, 26e were selected to represent the second set of virtual reference lines.

At step 518 (if desired), the 3D knit mesh may be rendered on a user interface of the application running on the computer system, in which the width of each polygon may be representative of the default stitch height. In other embodiments, depending on the orientation of the 3D knit mesh on the user interface, it is possible that the height of each polygon may instead be representative of the default stitch height. Further, the first and second sets of virtual reference lines may be displayed on the 3D knit mesh using the subset of polygons that were selected in step 516. As example of step 518 was provided in FIG. 2, in which the 3D knit mesh 200 was rendered on a user interface of the computer system. Further the first set of reference lines was rendered on 3D knit mesh 200 by dashed (vertical) lines 24a, 24b, 24c and the second set of reference lines was rendered on 3D knit mesh 200 by solid (horizontal) lines 26a, 26b, 26c, 26d, 26e. Step 518 branches off from the main flow, and hence is depicted in dashed outline to bring out this aspect.

At step 520, the application running on the computer system may generate knitting instructions based on the 3D knit mesh, such instructions further specifying that the first and second sets of virtual reference lines (or more generally, one or more sets of virtual reference indicators) be knitted as physical reference lines on a surface of the knitted article. As described above, step 520 may involve converting the 3D knit mesh into a 2D knitting map (as depicted in FIG. 3A), and then generating knitting instructions from the 2D knitting map, as described in US 2023/0357969 to Samosir et al.

At step 522, a computer-controlled flatbed knitting machine may knit the knitted article in accordance with the knitting instructions from step 520.

At step 524, a user may perform a physical measurement corresponding to an isoline segment belonging to a first one of the sections formed by the first set of virtual reference lines. An example of step 524 was provided above in FIG. 4, in which the length of physical reference line segment 46 (corresponding to isoline segment 16d depicted in FIG. 1B) was measured to be 5.65 cm.

At step 525, the user may retrieve the length of the corresponding isoline segment, or equivalently, a user interface of the computer system may provide the length of the corresponding isoline segment to the user. An example of step 524 was provided above in FIG. 5, in which a user interface provided the length of isoline segment 16d as 4.35 cm.

At step 526, the user may compare the physical measurement with the length of corresponding isoline segment. In the above example, the user would compare the physical measurement of 5.65 cm to the length of the corresponding isoline segment of 4.35 cm.

At step 528, the user may determine whether the physical measurement and the length of corresponding isoline segment match within a tolerance. If so ("yes" branch of step 528), the process may proceed to step 530. If not ("no" branch of step 528), the process may proceed to step 544. Various embodiments of tolerance were provided above with respect to step 412, and the same or similar measures of tolerance may be used by the user in step 528.

At step 530, a user interface of the application running on the computer system may receive a compensation factor based on a ratio of the physical measurement and the length of the corresponding isoline segment. An example of step 530 was provided above in FIG. 6 in which the compensation factor of 1.30, computed as the ratio of the physical measurement 5.65 cm and the length of the corresponding isoline segment 4.35 cm, was received by a text box 56 of user interface 500.

At step 532, the application running on the computer system may scale an exact (unrounded) number of stitches for each of the isoline segments within the first section by the compensation factor. One example of step 532 was provided in FIG. 10A, in which the 23.22 stitches spanning isoline segment 16*e* was scaled by the compensation factor of 1.3 to arrive at the compensated exact (unrounded) number of stitches of 17.86 stitches. Another example of step 532 was provided in FIG. 10B, in which the 26.35 stitches spanning isoline segment 16*f* was scaled by the compensation factor of 1.3 to arrive at the compensated exact (unrounded) number of stitches of 20.27 stitches.

At step 534, the application running on the computer system may round the exact (unrounded) compensated number of stitches for each of the isoline segments within the first section. One example of step 534 was provided in FIG. 10A, in which the 17.86 stitches spanning isoline segment 16*e* were rounded (e.g., by the floor operator) to 17 stitches. Another example of step 534 was provided in FIG. 10B, in which the 20.27 stitches spanning isoline segment 16*f* were rounded (e.g., by the floor operator) to 20 stitches.

At step 536, the application running on the computer system may update the 3D knit mesh with the compensated number of stitches for each of the isoline segments within the first section.

If rendering of the updated 3D knit mesh is desired, the stitch height may be scaled by the compensation factor in step 538. One example of step 538 was provided in FIG. 10A, in which the stitch height of ⅙ cm per stitch was scaled by the compensation factor of 1.3 to arrive at 0.217. Additionally, if rendering of the updated 3D knit mesh is desired, the computer system may display a 3D knit mesh in which the width of each polygon within the first section is representative of the scaled stitch height. Further, the first and second sets of virtual reference lines may be displayed on the 3D knit mesh. An example of step 540 was provided above in FIG. 9B, in which a section of the compensated 3D knit mesh 201 included polygons, the width of each polygon being representative of the scaled stitch height. Steps 538 and 540 branch off from the main flow, and hence are depicted in dashed outline to bring out this aspect.

At step 542, the application running on the computer system may seek the input of the user as to whether additional evaluation of the shape of the knitted article is desired. If so ("yes" branch of step 542), the process may return to step 520. If not ("no" branch of step 542), the computer system may update the knitting instructions based on the 3D knit mesh from step 536, the knitting instructions omitting any physical reference lines (step 544). At step 546, a computer-controlled flatbed knitting machine may knit the knitted article in accordance with the knitting instructions from step 544.

As should be apparent in the discussion of embodiments of the invention, various operations referred to herein are machine operations. Useful machines for performing the operations of the present invention include both the target fabrication machines which will produce the desired articles being constructed, and digital computer systems or other similar devices. The present invention involves, to some degree, the production of instructions for operating, that is controlling the operation of, the target fabrication machines to produce a desired result. Those instructions by which the target fabrication machine will produce the desired result are created, in part, using one or more programmed digital computer systems, which in some cases may intercommunicate with one another. For example, in one embodiment of the invention, a first computer system, referred to as a "client" is used to construct and/or customize a 3D model of the article to be fabricated, and that model is then passed to a second computer system, referred to as a "server" or "host," where the 3D model is converted to a 2D bitmap or other representation suitable for translation into instructions for the target fabrication machine. In other cases, a single digital computer system may be used for both aspects of the operation, for example in a service-as-a-platform based approach in which a client computer system is used merely as a visualization and human-interaction instrument to observe, direct, and control processes executing on a server.

FIG. 16 illustrates an example of the architecture described immediately above. In this arrangement, a computer system 601 is programmed via stored processor-executable instructions to interact with a server 692 in the production of instructions for operating, that is controlling the operation of, the target fabrication machine(s) 694 to produce a desired result in accordance with the present invention. In one embodiment, computer system 601 acts as a client to server 692 and is programmed to allow a user to construct and/or customize a 3D model of the article to be fabricated, which model is then passed to server 692 where the 3D model is converted to a 2D bitmap or other representation suitable for translation into instructions for the target fabrication machine. In another embodiment, server 692 is used by computer system 601 for both aspects of the operation (e.g., as a service-as-a-platform), and allows a user to interact with programs running on server 692 via a web browser or other client application. In the foregoing description, when an operation is described as being performed by an application running on a computer system, it should be understood that particular processor-executable instructions which make up such an application, when executed by one or more processors, such as processor(s) 602 of computer system 601 or similar processor(s) of the server, cause those processors to perform the described operations, in some cases by invoking other elements of the computer system to operate in accordance with the functions specified by the instructions.

As illustrated, computer system 601 generally includes a communication mechanism such as a bus 610 for passing information (e.g., data and/or instructions) between various components of the system, including one or more processors 602 for processing the data and instructions. Processor(s) 602 perform(s) operations on data as specified by the stored computer programs on computer system 601, such as the stored computer programs for running a web browser and/or for constructing and/or customizing a 3D model of the article to be fabricated that make up the application described herein and/or visualizing results of server-based operations of such an application. The stored computer programs for computer system 601 and server 692 may be written in any convenient computer programming language and then compiled into a native instructions for the processors resident on the respective machines.

Computer system 601 also includes a memory 604, such as a random access memory (RAM) or any other dynamic storage device, coupled to bus 610. Memory 604 stores information, including processor-executable instructions, data, and temporary results, for performing the operations described herein. Computer system 601 also includes a read only memory (ROM) 606 or any other static storage device coupled to the bus 610 for storing static information, including processor-executable instructions, that is not changed by the computer system 601 during its operation. Also coupled to bus 610 is a non-volatile (persistent) storage device 608, such as a magnetic disk, optical disk, solid-state disc, or similar device for storing information, including processor-executable instructions, that persists even when the computer system 601 is turned off. Memory 604, ROM 606, and storage device 608 are examples of a non-transitory "computer-readable medium."

Computer system 601 may also include human interface elements, such as a keyboard 612, display 614, and cursor control device (e.g., a mouse or trackpad) 616, each of which is coupled to bus 610. These elements allow a human user to interact with and control the operation of computer system 601. For example, these human interface elements may be used for controlling a position of a cursor on the display 614 and issuing commands associated with graphical elements presented thereon. In the illustrated example of computer system 601, special purpose hardware, such as an application specific integrated circuit (ASIC) 620, is coupled to bus 610 and may be configured to perform operations not performed by processor 602; for example, ASIC 620 may be a graphics accelerator unit for generating images for display 614.

To facilitate communication with external devices, computer system 601 also includes a communications interface 670 coupled to bus 610. Communication interface 670 provides bi-directional communication with remote computer systems such as server 692 and host 682 over a wired or wireless network link 678 that is communicably connected to a local network 680 and ultimately, through Internet service provider 684, to Internet 690. Server 692 is connected to Internet 690 and hosts a process that provides a service in response to information received over the Internet. For example, server 692 may host some or all of a process that provides a user the ability to construct and/or customize a 3D model of an article to be fabricated, which 3D model is then converted to a 2D bitmap or other representation suitable for translation into instructions for the target fabrication machine, in accordance with embodiments of the present invention. It is contemplated that components of an overall system can be deployed in various configurations within one or more computer systems (e.g., computer system 601, host 682 and/or server 692).

Thus, methods for updating knitting instructions based on a physical measurement of a knitted article, have been described.

What is claimed is:

1. A computer-implemented method for updating knitting instructions, the method comprising:

defining one or more virtual reference indicators on a surface of a three-dimensional (3D) model of an article to be knitted by a computer-controlled flatbed knitting machine, wherein the 3D model is defined in a 3D space represented in an application running on a computer system and is displayed on a display of the computer system within a user interface of the application, and wherein the one or more virtual reference indicators define one or more regions;

generating knitting instructions for the computer-controlled flatbed knitting machine, wherein the knitting instructions specify that the one or more virtual reference indicators defined on the surface of the 3D model are to be knitted as one or more physical reference indicators that form part of the knitted article;

knitting the knitted article using the knitting instructions; and updating the knitting instructions by adjusting at least one of a number of courses or a number of wales within the one or more regions of the 3D model by dividing the at least one of the number of courses or the number of wales by a compensation factor that accounts for differences between a physical measurement that specifies a first distance along a first path along the knitted article, the first path being defined by the one or more physical reference indicators that form part of the knitted article, and an intended dimension of said first distance, wherein the updating of the knitting instructions by the adjusting of the at least one of the number of courses or the number of wales within the one or more regions of the 3D model comprises using a ratio between the physical measurement and a virtual measurement corresponding to the physical measurement as the compensation factor, wherein the virtual measurement specifies a second distance along a second path on the surface of the 3D model, the second path being defined by the one or more virtual reference indicators.

2. The computer-implemented method of claim 1, the physical measurement is received via the user interface of the application.

3. The computer-implemented method of claim 1, further comprising displaying, on the user interface of the application, the virtual measurement corresponding to the physical measurement.

4. The computer-implemented method of claim 1, wherein the generating of the knitting instructions for the computer-controlled flatbed knitting machine comprises generating a 3D knit mesh from the 3D model, the 3D knit mesh comprising a plurality of polygons, each of the polygons representing one or more stitches of the knitted article, and wherein the one or more virtual reference indicators are represented by a subset of the plurality of polygons of the 3D knit mesh.

5. The computer-implemented method of claim 4, further comprising displaying, on the user interface of the application, the 3D knit mesh.

6. The computer-implemented method of claim 4, wherein the generating of the knitting instructions for the computer-controlled flatbed knitting machine further comprises:

generating a two-dimensional (2D) knitting map from the 3D knit mesh, the 2D knitting map comprising a plurality of pixels arranged within a 2D plane, each of the pixels representing the one or more stitches of the knitted article, and wherein the one or more virtual reference indicators are represented by a subset of the plurality of pixels of the 2D knitting map; and generating the knitting instructions from the 2D knitting map.

7. The computer-implemented method of claim 6, further comprising displaying, on the user interface of the application, the 2D knitting map.

8. The computer-implemented method of claim 1, wherein the updated knitting instructions include instructions to generate the knitted article with the physical reference indicators.

9. The computer-implemented method of claim 1, wherein the updated knitting instructions include instructions to generate the knitted article without the physical reference indicators.

10. The computer-implemented method of claim 1, wherein the one or more physical reference indicators include at least one physical reference point or at least one physical reference line.

11. The computer-implemented method of claim 1, wherein the one or more virtual reference indicators include at least one virtual reference point or at least one virtual reference line.

12. The computer-implemented method of claim 1, wherein the one or more physical reference indicators includes a physical reference line, and the first path extends along the physical reference line.

13. The computer-implemented method of claim 1, wherein the one or more physical reference indicators includes a first and a second physical reference line, and the first path extends between the first and second physical reference lines.

14. The computer-implemented method of claim 1, wherein the one or more virtual reference indicators includes a virtual reference line, and the second path extends along the virtual reference line.

15. The computer-implemented method of claim 1, wherein the one or more virtual reference indicators includes a first and a second virtual reference line, and the second path extends between the first and second virtual reference lines.

16. The computer-implemented method of claim 1, wherein the one or more physical reference indicators includes a physical reference line that extends along a course or a wale of the knitted article.

17. The computer-implemented method of claim 1, wherein the one or more virtual reference indicators on the surface of the 3D model are specified (i) automatically by the application running on the computer system, (ii) manually by a user, or by a combination of (i) and (ii).

18. The computer-implemented method of claim 17, wherein the application automatically allocates more virtual reference lines to regions of the 3D model with greater curvature, and fewer virtual reference lines to regions of the 3D model with less curvature.

19. The computer-implemented method of claim 1, further comprising defining one or more isolines on the surface of the 3D model, wherein the one or more virtual reference indicators comprise a plurality of virtual reference lines, and wherein the virtual reference lines segment the one or more isolines into one or more isoline segments.

20. The computer-implemented method of claim 19, wherein the user interface of the application is configured to receive a selection of the one or more isoline segments and display respective lengths of the selected one or more isoline segments.

* * * * *